(12) United States Patent
Bultitude et al.

(10) Patent No.: US 12,040,135 B2
(45) Date of Patent: *Jul. 16, 2024

(54) RESONANT MULTILAYER CERAMIC CAPACITORS

(71) Applicant: KEMET Electronics Corporation, Fort Lauderdale, FL (US)

(72) Inventors: John Bultitude, Simpsonville, SC (US); Nathan A. Reed, Simpsonville, SC (US); Allen Templeton, Simpsonville, SC (US); James R. Magee, Simpsonville, SC (US); James Davis, Simpsonville, SC (US); Abhijit Gurav, Simpsonville, SC (US); Hunter Hayes, Simpsonville, SC (US); Hanzheng Guo, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/107,154

(22) Filed: Feb. 8, 2023

(65) Prior Publication Data

US 2023/0187134 A1     Jun. 15, 2023

Related U.S. Application Data

(62) Division of application No. 17/467,841, filed on Sep. 7, 2021, now Pat. No. 11,621,126.

(Continued)

(51) Int. Cl.
*H01G 4/12* (2006.01)
*C04B 35/465* (2006.01)

(Continued)

(52) U.S. Cl.
CPC ......... *H01G 4/1245* (2013.01); *C04B 35/465* (2013.01); *C04B 35/495* (2013.01);
(Continued)

(58) Field of Classification Search
None
See application file for complete search history.

(56) References Cited

U.S. PATENT DOCUMENTS 6,627,570 B2 *   9/2003   Fukui ...................... C04B 35/47
                                                361/321.2
6,674,321 B1 *   1/2004   York ........................ H01G 7/06
                                                327/586

(Continued)

FOREIGN PATENT DOCUMENTS

| CN | 1249286 A | * | 4/2000 | ......... C04B 35/4682 |
| JP | 2005538582 A | * | 12/2005 | |
| JP | 2017014094 A | * | 1/2017 | ........... C01G 25/006 |
| WO | WO-2019051346 A1 | * | 3/2019 | ............... H01G 2/06 |

*Primary Examiner* — Dion R. Ferguson
(74) *Attorney, Agent, or Firm* — Joseph T. Guy; Patent Filing Specialist Inc.

(57) ABSTRACT

Provided is an improved multilayered ceramic capacitor and an electronic device comprising the multilayered ceramic capacitor. The multilayer ceramic capacitor comprises first conductive plates electrically connected to first external terminations and second conductive plates electrically connected to second external terminations. The first conductive plates and second conductive plates form a capacitive couple. A ceramic portion is between the first conductive plates and said second conductive plates wherein the ceramic portion comprises paraelectric ceramic dielectric. The multilayer ceramic capacitor has a rated DC voltage and a rated AC $V_{PP}$ wherein the rated AC $V_{PP}$ is higher than the rated DC voltage.

87 Claims, 23 Drawing Sheets

Related U.S. Application Data

(60) Provisional application No. 63/076,444, filed on Sep. 10, 2020.

(51) Int. Cl.
*C04B 35/495* (2006.01)
*C04B 35/50* (2006.01)
*H01G 4/30* (2006.01)
*H01G 4/40* (2006.01)

(52) U.S. Cl.
CPC ........... *C04B 35/50* (2013.01); *H01G 4/1227* (2013.01); *H01G 4/30* (2013.01); *H01G 4/306* (2013.01); *H01G 4/40* (2013.01); *C04B 2235/66* (2013.01)

(56) References Cited

U.S. PATENT DOCUMENTS

| | | | |
|---|---|---|---|
| 9,087,648 B2* | 7/2015 | Bultitude | H01G 4/012 |
| 9,627,134 B2* | 4/2017 | Park | H01G 4/005 |
| 9,799,454 B1* | 10/2017 | Jakoubovitch | H01G 4/40 |
| 11,621,126 B2* | 4/2023 | Bultitude | H01G 4/1227 |
| | | | 361/321.2 |
| 2002/0000825 A1* | 1/2002 | Sirane | G01R 31/129 |
| | | | 324/762.01 |
| 2008/0107800 A1* | 5/2008 | Randall | C04B 35/64 |
| | | | 427/79 |
| 2013/0250473 A1* | 9/2013 | Bultitude | H01G 4/30 |
| | | | 29/25.42 |
| 2017/0025223 A1* | 1/2017 | Bultitude | B23K 1/008 |
| 2018/0190430 A1* | 7/2018 | McConnell | B23K 35/3613 |
| 2022/0076892 A1* | 3/2022 | Bultitude | C04B 35/50 |

* cited by examiner

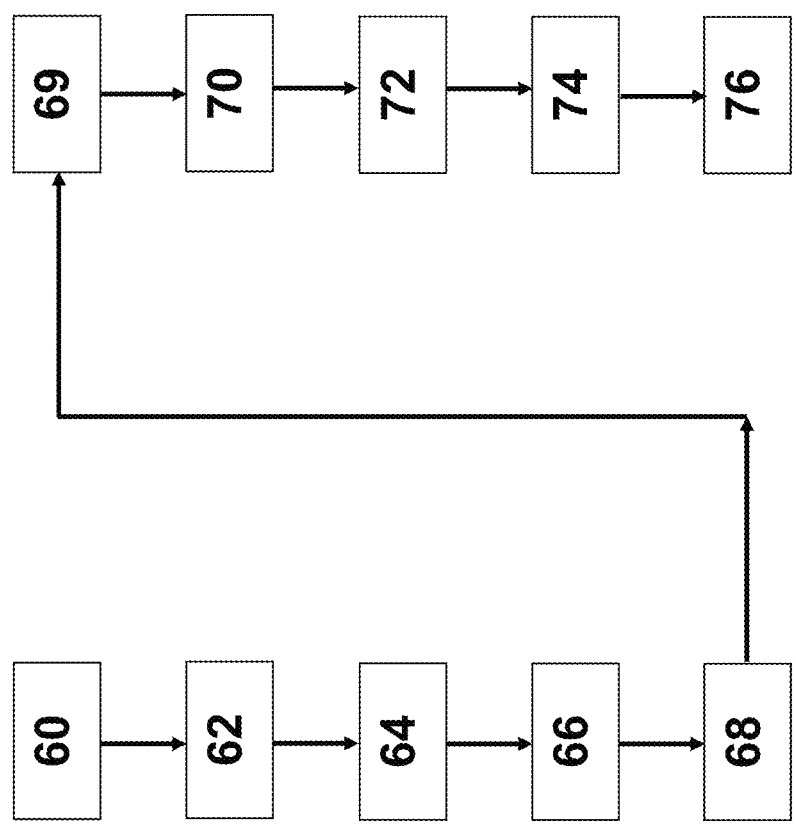

RESONANT MULTILAYER CERAMIC CAPACITORS

CROSS-REFERENCE TO RELATED APPLICATIONS

This application claims priority to U.S. Provisional Appl. No. 63/076,444 filed Sep. 10, 2020 which is incorporated herein by reference.

FIELD OF THE INVENTION

The present invention is related to an improved capacitor which is particularly suitable for high voltage AC applications. More specifically, the present invention is related to a multilayered ceramic capacitor that can be reliably operated at a higher peak-to-peak AC voltage than the DC voltage rating.

BACKGROUND

There is a continuing trend towards high power electrical circuits. Though not limited thereto, the increasing demand for electric vehicles has placed a significant burden on developers of electrical circuits and components used therein. For the purposes of this invention, the focus is on the demand for the use of high voltage AC power and electronic capacitors for use therein. Multilayered ceramic capacitors (MLCC's) have been very successfully used in high voltage DC circuits and they are now often the technology of choice in such applications. The use of MLCC's in AC circuits has significant issues which has limited their wide spread use in high voltage AC applications.

A higher capacitance value MLCC draws more current so the capacitor heats-up more than an equivalent MLCC with a lower capacitance. Current (I) is related to voltage (V) and impedance of the capacitor ($Z_c$) by the relationship shown in Equation 1.

$$I = V/Z_c \qquad \text{Equation 1}$$

The impedance of the capacitor ($Z_c$) is a reasonable approximation to the reactance of the capacitor ($X_c$) and therefore reactance can be approximated based on the measurement frequency (f) and capacitance (C) as shown in Equation 2.

$$Z_c \approx X_c = 1/2 \ast \pi \ast f \ast C \qquad \text{Equation 2}$$

Transposing Equations 1 and 2 results in Equation 3.

$$I = V \ast 2 \ast \pi \ast f \ast C \qquad \text{Equation 3}$$

Based on the relationships of Equation 3, for a given voltage and frequency, increasing capacitance will increase the current. Furthermore, Real Power dissipated is related to the current (I) and ESR of the capacitor by Equation 4.

$$\text{Real Power} = I^2 \ast \text{ESR} \qquad \text{Equation 4}$$

ESR at a given frequency is reactance of the capacitor ($X_c$) multiplied by the dissipation factor of the capacitor at that frequency ($DF_f$) as indicated in Equation 5.

$$ESR_f = X_c \ast DF_f \qquad \text{Equation 5}$$

The Real Power dissipated is therefore directly proportional to the capacitance as indicated in Equation 6.

$$\text{Real Power} = V^2 \ast 2 \ast \pi \ast f \ast C \ast DF_f \qquad \text{Equation 6}$$

Based on the foregoing relationships it is evident that as the current draw increases from increased capacitance, the power dissipated also increases.

In the case of MLCC's using C0G ceramics the capacitance does not change with temperature so the current remains relatively constant. Therefore, as the part heats up the temperature generated through the real power heat dissipation must be removed, such as through external conduction, away from the MLCC. This is a critical design limitation which must be addressed.

In AC applications it is important to minimize the ripple current heating in order to achieve reliable performance. However, this is complicated by the fact that the frequency has a significant effect which must be accounted for in the design. At lower frequencies, typically at or below 100 kHz, the performance of the MLCC is in a voltage-limited region whereas at higher frequencies the capability is in the current-limited region. In the current-limited region the current is limited by the subsequent heating of the part based on the relationship of Equation 4. This is illustrated the diagram in FIG. 1.

In the voltage limited region the peak-to-peak ($V_{pp}$) AC voltage should not exceed the DC voltage level to ensure reliable performance without excessive heating. MLCCs are typically rated by their DC voltage ($V_{dc}$) that is equivalent to the AC ($V_{pp}$) rating. The RMS AC Voltage ($V_{rms}$) being related to $V_{dc}$ by the relationship given in Equation 7.

$$V_{rms} = \frac{V_{dc}}{2\sqrt{2}} \qquad \text{Equation 7}$$

Therefore, advances in MLCC's intended for use in DC circuitry and AC circuitry have been on a parallel course since the relationship of voltage rating has been considered correlated by the relationship of Equation 7. This has limited the use of MLCC's in high voltage AC applications to only those capacitors having a high rated DC voltage since the peak-to-peak voltage, $V_{PP} = 2\sqrt{2} \, V_{rms}$, the $V_{PP}$ should not exceed the rated DC voltage in accordance with the prior art.

The present invention provides a MLCC with a peak to peak rated AC peak to peak voltage which far exceeds the expectation in the art based on the established relationship set forth in Equation 7. The present invention therefore provides an MLCC, and devices using an MLCC, which can withstand significantly higher AC voltage than previously considered suitable.

SUMMARY OF THE INVENTION

The present invention is related to an improved MLCC which is particularly suitable for use in high AC voltage application.

More specifically, the present invention is related to an improved MLCC which has a higher rated peak-to-peak AC voltage than DC rated voltage which is contrary to accepted theory and practice in the art.

A particular feature of the improved MLCC is the ability to withstand high AC voltage, such as 950 to 5700 $V_{PP}$, without significant degradation of ESR.

Yet another particular feature of the improved MLCC is the ability to withstand elevated temperature, at high AC $V_{PP}$, without degradation of ESR or lack of performance.

These and other embodiments, as will be realized, are provided in a multilayer ceramic capacitor comprising first conductive plates electrically connected to first external terminations and second conductive plates electrically connected to second external terminations. The first conductive plates and second conductive plates form a capacitive couple. A ceramic portion is between the first conductive plates and said second conductive plates wherein the ceramic portion comprises paraelectric ceramic dielectric. The multilayer ceramic capacitor has a rated DC voltage and a rated AC voltage wherein the rated AC $V_{PP}$ is higher than the rated DC voltage.

Yet another embodiment is provided in an electronic device comprising a first multilayer ceramic capacitor. The multilayered ceramic capacitor comprises first conductive plates electrically connected to first external terminations and second conductive plates electrically connected to second external terminations wherein the first conductive plates and second conductive plates form a capacitive couple. A ceramic portion is between the first conductive plates and second conductive plates wherein the ceramic portion comprises paraelectric ceramic dielectric. The multilayer ceramic capacitor has a rated DC voltage and a rated AC $V_{PP}$ wherein the rated AC $V_{PP}$ is higher than the rated DC voltage.

Yet another embodiment is provided in a method of forming a multilayered ceramic capacitor comprising:
  forming a paraelectric dielectric ceramic comprising an oxide represented by General Formula A:

$$(Ca_eSr_g)_j(Zr_kTi_p)_qO_3 \quad \text{General Formula A}$$

wherein:
  e=0.60 to 1.00; g=0.00 to 0.40; k=0.50 to 0.97; p=0.03 to 0.50; and j/q=0.99 to 1.01;
  forming a ceramic slip comprising the dielectric ceramic;
  forming a coating of the ceramic slip on a substrate;
  printing a pattern of conductive ink on said coating to form a printed coating;
  forming a stack comprising the printed coating wherein adjacent printed coatings are offset and alternated printed coatings are registration;
  forming a laminate of the stack;
  separating the laminate into green chips;
  sintering the green chips wherein the conductive ink forms first conductive plates and second conductive plates and the ceramic slip forms a ceramic portion between the first conductive plates and second conductive plates; and
  terminating the sintered green chips.

Yet another embodiment is provided in a method of forming a multilayered ceramic capacitor comprising:
  forming a paraelectric ceramic dielectric defined by General Formula B:

$$U_aX_bY_cZ_d((Ca_{1-x-y}Sr_xM_y)_m(Zr_{1-u-v}Ti_uHf_v)O_3)_{1-a-b-c-d} \quad \text{General Formula B}$$

wherein:
  M is at least one alkaline earth selected from the group consisting of Ba and Mg;
  U comprising a carbonate or oxide of at least one first transition metal selected from the group consisting of Zn, Cu, Ni, Co, Fe, Mn, Cr, and Al;
  X comprises at least one sintering aid comprising a compound comprising at least one element selected from the group consisting of Li, B, and Si;
  Y comprises a carbonate or oxide of at least one second transition metal selected from the group consisting of W, Ta, and Mo;
  Z comprises at least one rare-earth element selected from the group consisting of Y, Sc, La, Ce, Pr, Nd, Sm, Eu, Gd, Tb, Dy, Ho, Er, Tm, Yb and Lu;
  $0<a<0.06$; $0.0001<b<0.15$; $0<c\leq0.06$; $0<d<0.06$; $0\leq x\leq1$; $0\leq y\leq1$; $0\leq u\leq1$; $0\leq v\leq0.2$; and $0.98\leq m\leq1.02$;

forming a ceramic slip comprising the paraelectric ceramic dielectric;
  forming a coating of ceramic slip on a substrate;
  printing a pattern of conductive ink on the coating to form a printed coating;
  forming a stack comprising the printed coating wherein adjacent printed coatings are offset and alternated printed coatings are registration;
  forming a laminate of the stack;
  separating the laminate into green chips;
  sintering the green chips wherein the conductive ink forms first conductive plates and second conductive plates and the ceramic slip forms a ceramic portion between the first conductive plates and second conductive plates; and terminating the sintered green chips.

BRIEF DESCRIPTION OF DRAWINGS

FIG. 24 is a flow-chart illustration of an embodiment of the invention.

DESCRIPTION

The present invention is related to an improved MLCC wherein the peak-to-peak rated AC ($V_{PP}$) exceeds the rated DC voltage by at least 10% and more preferably by at least 20%, which is contrary to expectations in the art and contradicts accepted theoretical models. More specifically, the present invention provides an MLCC with a Voltage Enhanced U2J (VEU2J) paraelectric ceramic dielectric.

A particular feature of the invention is the ability to provide an MLCC which is particularly suitable for use as a high AC $V_{pp}$ resonant capacitor. These MLCCs are made with paraelectric VEU2J ceramic which can achieve reliable performance at higher AC $V_{PP}$ than current MLCC's with comparable rated DC voltage as evidenced by comparative low surface temperature under the application of high AC $V_{PP}$ for extended time. Their stability is enhanced, in part, due to a negative coefficient of capacitance above 25° C. as well as a stable ESR with respect to high AC $V_{PP}$ and temperature. These MLCCs, utilizing VEU2J dielectric, are very effective at distributing temperature evenly throughout multi-capacitor arrays under high AC $V_{PP}$ operation. If the temperature of an individual capacitor increases the capacitance of the capacitor decreases thereby reducing the current in accordance with Equation 3. As the current decreases temperature also decreases thereby compensating for any manufacturing differences in the components themselves.

Figure 1:
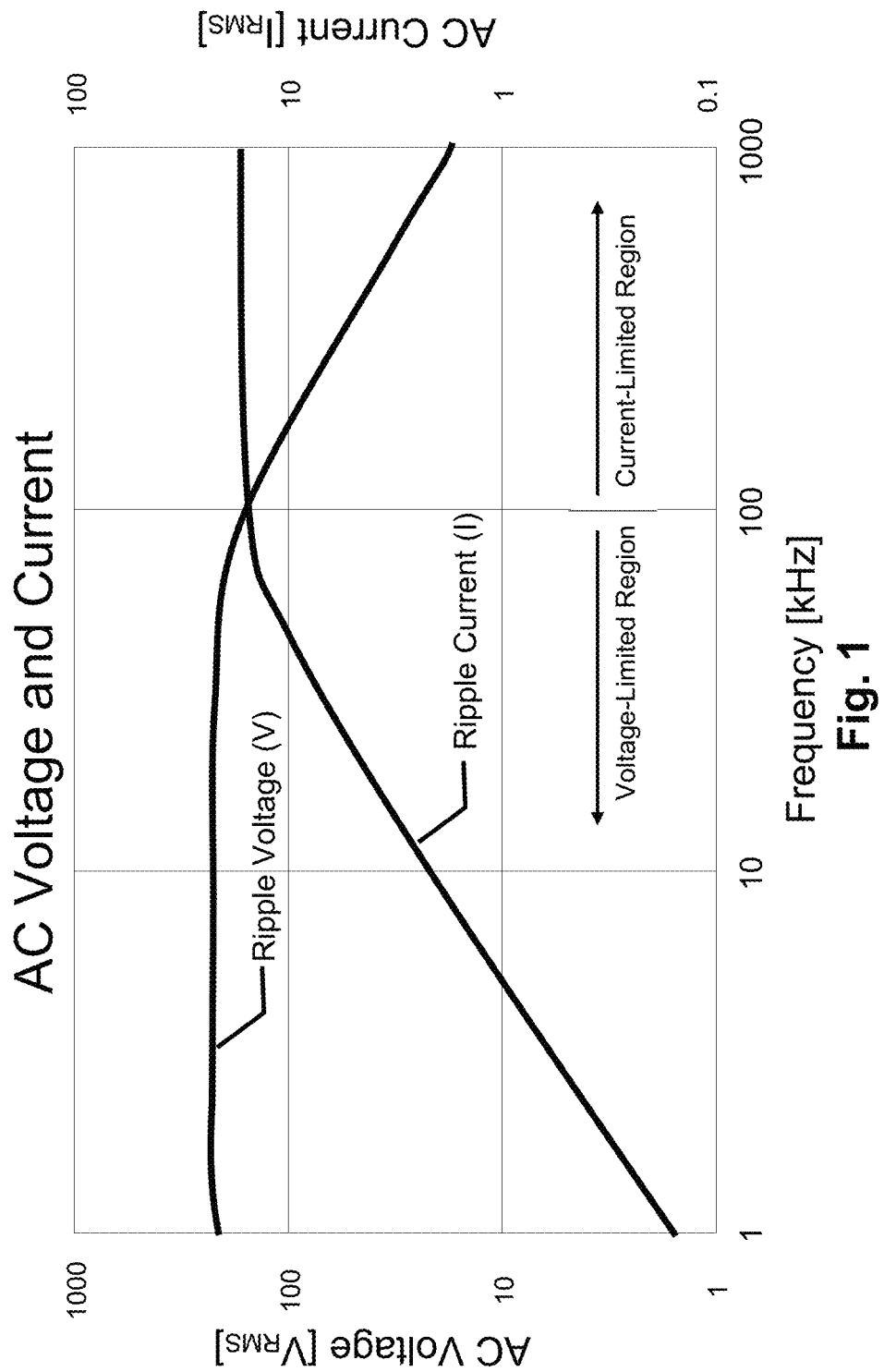
FIG. 1 graphically illustrates MLCC capability limits as a function of frequency.
Figure 2:
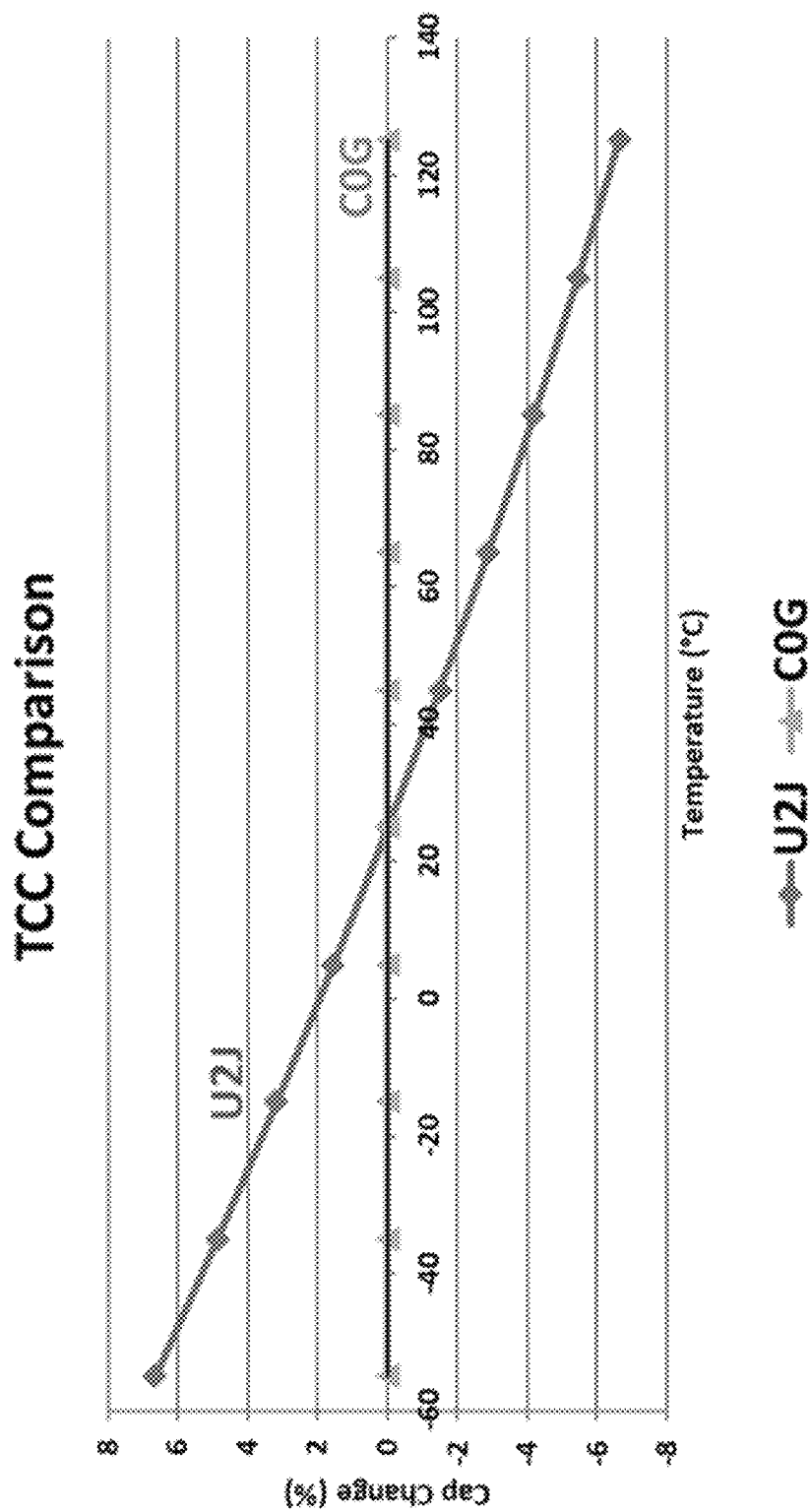
FIG. 2 graphically illustrates Temperature Coefficient of Capacitance.

As discussed above, In the case of capacitors made with C0G ceramics the capacitance does not change significantly with temperature so the current remains relatively constant. By convention, for a C0G capacitor, capacitance changes +/−30 PPM/° C., relative to the value at 25° C., over a temperature range of −55° C. to +125° C. As the capacitor heats up the temperature generated through the real power heat dissipation must be removed from the MLCC such as through external conduction. In contrast, with a capacitor comprising VEU2J ceramic the capacitance decreases with increasing temperature, as illustrated in FIG. 2, and therefore the capacitor draws less current as the part heats up.

More specifically, the present application provides a multilayer ceramic capacitor device formed by a plurality of laminated ceramic layers and a plurality of internal electrode layers wherein the ceramic layers and internal electrode layers are alternatively stacked. The ceramic layers are made by the disclosed dielectric compositions, and the internal electrodes layers are made by conductive paste mainly containing base metals such as Ni and the like. The obtained multilayer ceramic capacitor can have a temperature coefficient of capacitance within ±1000 ppm/° C. over a temperature range from −55° C. to 150° C. after co-firing at low oxygen partial pressure.

The declining capacitance of VEU2J with increasing temperature leads to a slower increase in temperature with time even at increased AC voltages and currents. In order to assess the reliability of an MLCC under AC voltage conditions the extent of AC ripple current heating has been defined in terms of risk of failure as the surface temperature increases above ambient. For the purposes of this invention a temperature increase of 25° C. above ambient is considered low risk, a temperature increase of 25° C. to 50° C. above ambient is considered medium risk and application specific dependent and a temperature increase 50° C. above ambient is considered to have an increased risk of thermal runaway and overvoltage failures.

Rated DC voltage is the maximum DC voltage that a capacitor can store and reliably operate under this bias. Whereas rated DC voltage and rated AC $V_{PP}$ are considered related by Equation 7, the rated AC $V_{PP}$ and rated DC voltage are not related in the inventive capacitors. In the present invention the rated AC $V_{PP}$ is higher than expected based rated DC voltage in accordance with Equation 7. Rated DC voltage is typically confirmed by taking a sacrificial capacitor, equivalent to a test capacitor, and exposing the sacrificial capacitor to increasing DC voltage until breakdown is achieved which is referred to as breakdown voltage. For the purpose of this invention rated DC voltage is defined as 60% of mean breakdown voltage to allow for manufacturing and test variation. Therefore, for the purposes of this invention the rated AC voltage is higher peak to peak than 60% of the DC breakdown voltage of an equivalent part.

The invention will be described with reference to the figures forming an integral, non-limiting, component of the disclosure. Throughout the various figures similar elements will be numbered accordingly.

Figure 3:
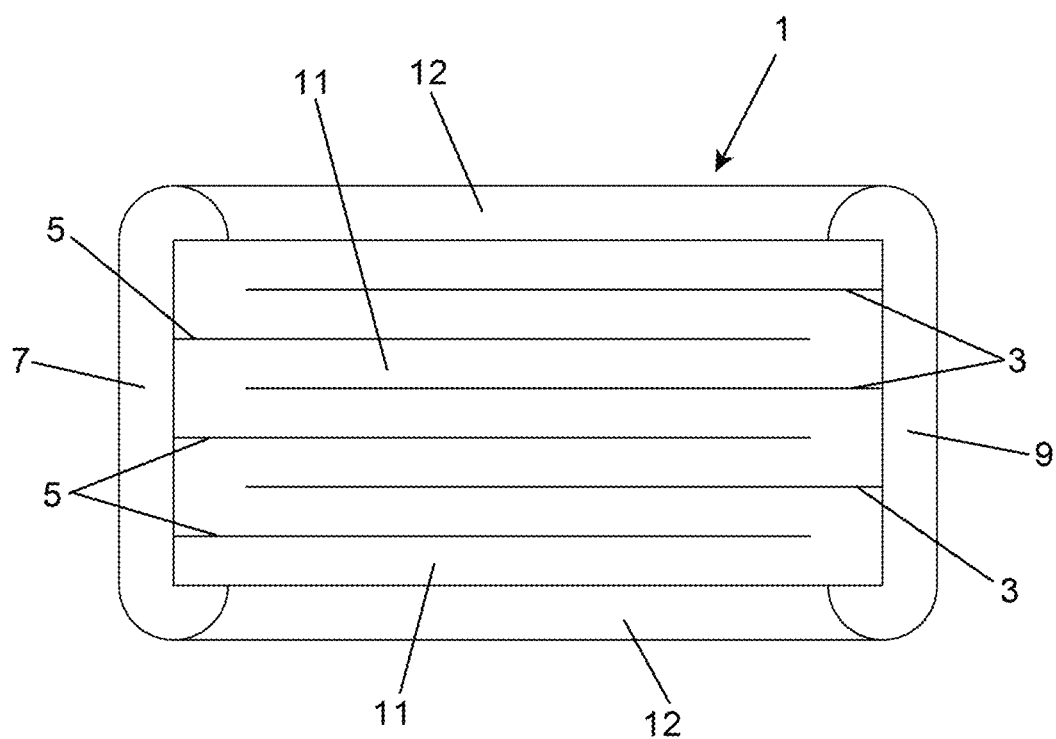
FIG. 3 illustrates an MLCC in cross-sectional schematic view.

An embodiment of the invention will be described with reference to FIG. 3 wherein a multilayered ceramic capacitor is illustrated in cross-sectional side view. First conductive plates, 3, serve as electrodes and are electrically connected to first external terminations, 9. Second conductive plates, 5, serve as electrodes and are electrically connected to second external terminations, 7. The first conductive plates and second conductive plates have opposing polarity and form a conductive couple. The electrodes are separated or isolated by VEU2J dielectric, 11. An optional but preferred resin, 12, encases a portion of the capacitor as known in the art.

Figure 5:
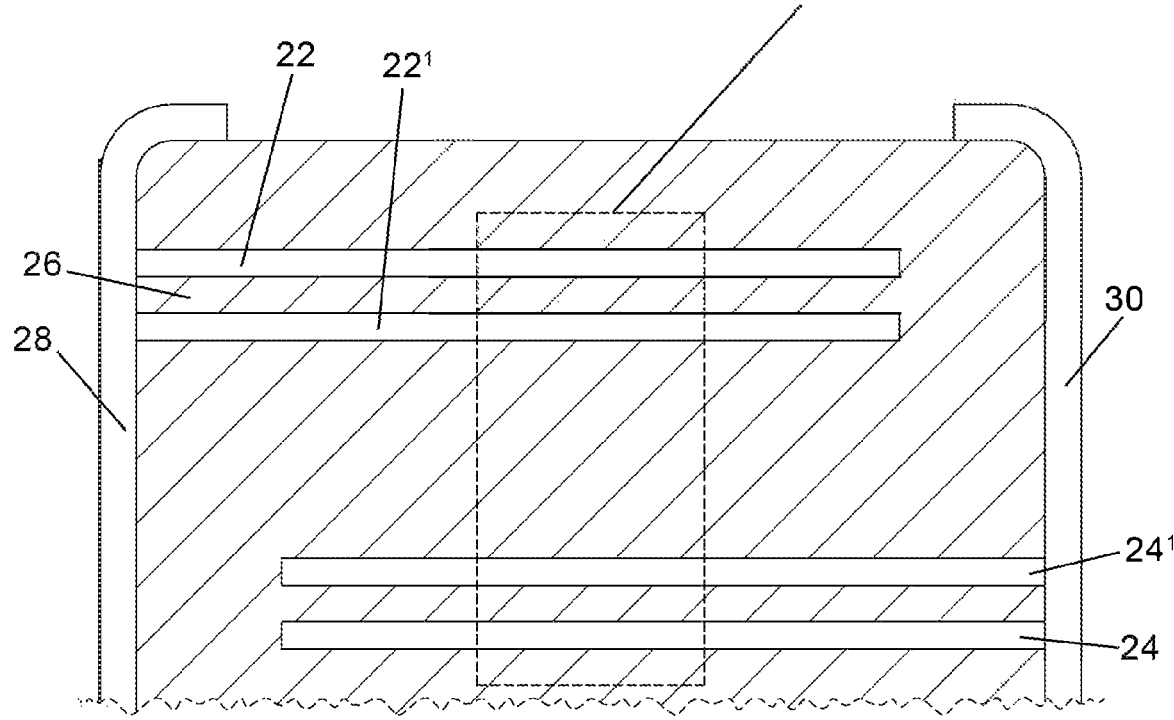
FIG. 5 illustrates a portion of FIG. 4.
Figure 4:
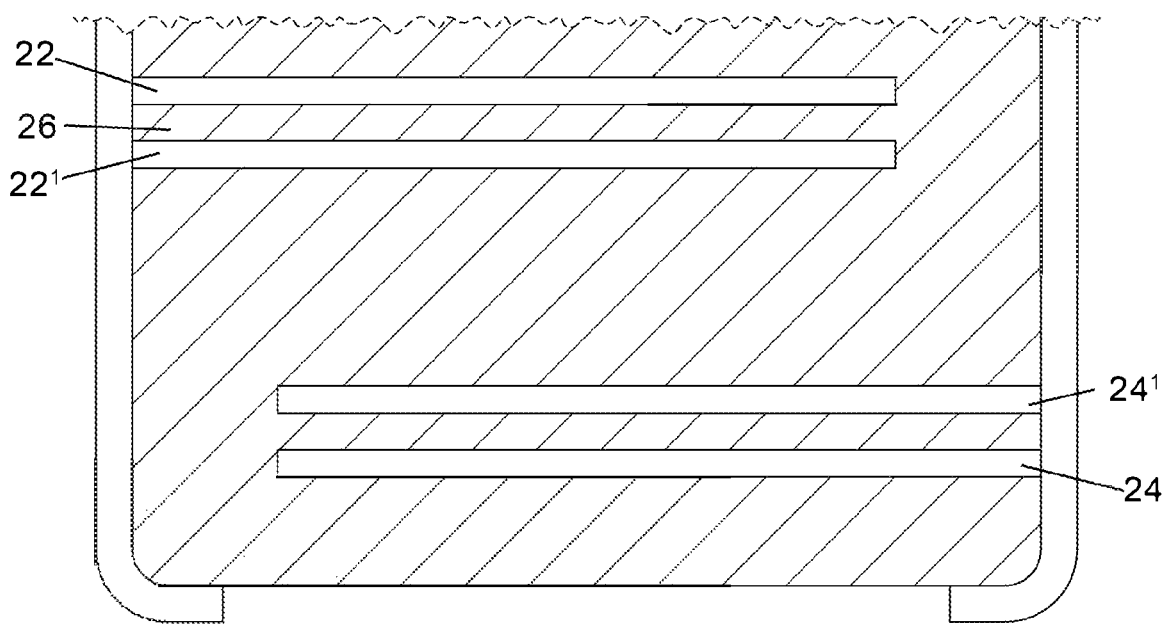
FIG. 4 illustrates an embodiment of the invention in cross-sectional schematic view.
Figure 5:
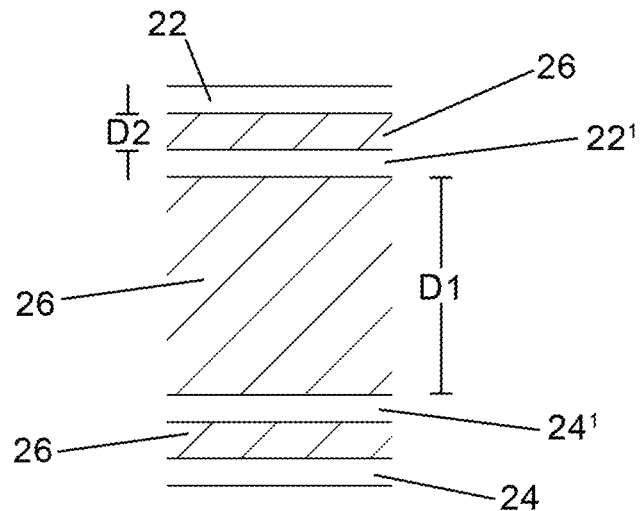

An embodiment of the invention will be described with reference to FIG. 4. A portion of the capacitor of FIG. 4 is enlarged as FIG. 5. In FIG. 4, a double print capacitor, 20, is illustrated schematically in cross-sectional view. First conductive plates, 22 and 22', are double printed in close proximity and terminate at a first external termination, 28, and therefore have common polarity. The double print conductive plates are separated by VEU2J dielectric, 26. Second conductive plates, 24 and 24', are also double printed in close proximity and terminate at a second external termination, 30, and therefore have common polarity. VEU2J dielectric, 26, is between adjacent conductive plates of opposite polarity such as 22 and 24 or 22' and 24'. The separation between conductive plates of opposite polarity, D1 of FIG. 5, is at least five times the separation distance between conductive plates of common polarity, D2 of FIG. 5. More preferably the separation between conductive plates of opposite polarity is at least seven times the separation distance between conductive plates of common polarity.

The preparation of laminated ceramic capacitors is well documented and the present invention does not alter the manufacturing process to any significant degree relative to standard procedures known in the art.

A process for forming a MLCC will be described with reference to FIG. 24 wherein the process is illustrated by a flow chart representation. With reference to FIG. 24, a dielectric ceramic is formed at 60, from the dielectrics described herein preferably by solid state synthetic methods which are well known in the art. A ceramic slip is formed at 62 wherein the ceramic slip comprises the dielectric ceramic. The ceramic slip is a formable material. The ceramic slip typically comprises organic carriers and the like to allow for coating of the ceramic slip onto a substrate. A coating is formed, 64, of the ceramic slip onto a substrate. The substrate is not particularly limiting since it does not become part of the finished product. Polyethylene terephthalate (PET) is widely used in the art due to, among other things, cost and availability, and is suitable for demonstration of the invention. The method of forming the coating is not particularly limited with the exception of preference for those methods suitable for forming a coating of consistent thickness. Doctor blade methods are widely used and suitable for demonstration of the invention. The ceramic slip is dried at 66. The internal electrodes are formed by printing electrode patterns of conductive ink onto the dried ceramic slip at 68. The conductive ink preferably comprises a base metal with nickel or nickel alloy being preferred. A stack is formed at 70 wherein the stack comprises ceramic precursor layers, without printing, to form the dielectric ceramic layer which is external to the capacitive couple. Layers comprising the printed electrode pattern are then layered sequentially with adjacent layers are offset such that alternate printed electrode patterns are in registration. Additional layers which do not have printing are applied to form the opposite dielectric ceramic which is external to the capacitive couple. The layered structure is pressed and heated to form a laminate at 72. The laminate is diced to form green chips at 74. The green chips are sintered and terminated as known in the art to form a capacitor at 76.

The conductor which forms the internal electrode layers is preferably a base metal. Typical base metals are nickel and nickel alloys. Preferred nickel alloys are alloys of nickel with at least one member selected from Mn, Cr, Co, and Al, with such nickel alloys containing at least 95 wt % of nickel being more preferred. The nickel and nickel may alloys may contain up to about 0.1 wt % of phosphorous and other trace components. Other conductors which may be employed as internal electrodes such as copper, precious metal or alloys thereof with particularly preferred precious metals selected from palladium and silver. It would be understood that with copper or precious metal containing internal electrodes lower temperature firing is preferred.

The Voltage Enhanced U2J (VEU2J) ceramic is based on a calcium zirconate structure further comprising additives which enhance the ability of a capacitor comprising the VEU2J ceramic to withstand high AC $V_{PP}$ sufficient to have a rated AC $V_{PP}$ of at least 950 $V_{PP}$, up to 5700 $V_{PP}$, while having a rated DC voltage below the AC $V_{PP}$.

The VEU2J ceramic comprises a paraelectric ceramic dielectric with a negative coefficient of capacitance above 25° C. More preferably the VEU2J ceramic comprises at least 95 mole % of a paraelectric ceramic dielectric with a negative coefficient of capacitance above 25° C. The paraelectric ceramic dielectric of the VEU2J dielectric is a calcium strontium zirconium titanate ceramic having General Formula A:

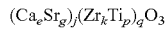   General Formula A wherein:
e=0.60 to 1.00;
g=0.00 to 0.40;
k=0.50 to 0.97;
p=0.03 to 0.50; and
j/q=0.99 to 1.01.

In General Formula A the VEU2J major component preferably comprises at least 90 mole % of the dielectric of General Formula A to which minor constituents are added. In General Formula A, the Ca or Zr can be substituted with Ba or Mg. In General Formula A the Zr or Ti can be substituted with Hf. The minor components may comprise a secondary component comprising Zn, Cu, Ni, Co, Fe, Mn, Cr, Al, Li, B, Si, W, Ta, Mo, Y, Sc, La, Ce, Pr, Nd, Sm, Eu, Gd, Tb, Dy, Ho, Er, Tm, Yb and Yu. A minimum of 0.5 mole % of these minor components is preferred.

More specifically, the VEU2J ceramic comprises an oxide represented General Formula B:

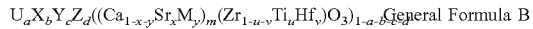   General Formula B wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
Z comprises at least one rare-earth element selected from the group consisting of Y, Sc, La, Ce, Pr, Nd, Sm, Eu, Gd, Tb, Dy, Ho, Er, Tm, Yb and Lu; $0<a<0.06$; $0.0001<b<0.15$; $0<c\leq0.06$; $0<d<0.06$; $0\leq x\leq1$; $0\leq y\leq1$; $0\leq u\leq1$; $0\leq v\leq0.2$; and $0.98\leq m\leq1.02$.

Even more specifically, the VEU2J ceramic comprises an oxide represented by General Formula B selected from the group consisting of Formula I wherein: M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo; $0<a<0.06$; $0.0001<b<0.15$; $0<c\leq0.06$; $d=0$; $0\leq x\leq1$; $0\leq y\leq1$; $0\leq u<0.8$; $0\leq v\leq0.2$; and $0.98\leq m\leq1.02$;

Formula II wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$; $0.0001<b<0.15$; $c=0$; $0<d<0.06$; $0\leq x\leq1$; $0\leq y\leq1$; $0.03<u\leq1$; $0\leq v\leq0.2$; and $0.98\leq m\leq1.02$;

Formula III wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0<a<0.06$; $0.0001<b<0.15$; $c=0$; $0<d<0.02$; $0\leq x\leq1$; $0\leq y\leq1$; $0\leq u\leq1$; $0\leq v\leq0.2$; and $0.98\leq m\leq1.02$;

Formula IV wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Ho, Er, Tm, Yb and Lu;

$0<a<0.06$; $0.0001<b<0.15$; $c=0$; $0<d<0.06$; $0 \le x \le 1$; $0 \le y \le 1$; $0 \le u \le 1$; $0 \le v \le 0.2$; and $0.98 \le m \le 1.02$;

Formula V wherein:

M is at least one alkaline earth selected from the group consisting of Ba and Mg;

U comprising a carbonate or oxide of at least one first transition metal selected from the group consisting of Zn, Cu, Ni, Co, Fe, Mn, Cr, and Al;

X comprises at least one sintering aid comprising a compound comprising at least one element selected from the group consisting of Li, B, and Si;

Z comprises at least one rare-earth element selected from the group consisting of Sc, La, Ce, Pr, Nd, Sm, Eu, Gd, Tb, Dy, Ho, Er, Tm, Yb and Lu;

$0<a<0.06$; $0.0001<b<0.15$; $c=0$; $0<d<0.06$; $0 \le x \le 1$; $0 \le y \le 1$; $0.1<u<0.55$; $0 \le v \le 0.2$; and $0.98 \le m \le 1.02$;

Formula VI wherein:

M is at least one alkaline earth selected from the group consisting of Ba and Mg;

U comprising a carbonate or oxide of at least one first transition metal selected from the group consisting of Zn, Cu, Ni, Co, Fe, Mn, Cr, and Al;

X comprises at least one sintering aid comprising a compound comprising at least one element selected from the group consisting of Li, B, and Si;

Z comprises at least one rare-earth element selected from the group consisting of Y, Sc, La, Ce, Pr, Nd, Sm, Eu, Gd, Tb, Dy, Ho, Er, Tm, Yb and Lu;

$0<a<0.06$; $0.0001<b<0.15$; $c=0$; $0.015<d<0.06$; $0 \le x \le 1$; $0 \le y \le 1$; $0.1<u<0.55$; $0 \le v \le 0.2$; $0.98 \le m \le 1.02$; and Formula VII wherein:

M is at least one alkaline earth selected from the group consisting of Ba and Mg;

U comprising a carbonate or oxide of at least one first transition metal selected from the group consisting of Zn, Cu, Ni, Co, Fe, Mn, Cr, and Al;

X comprises at least one sintering aid comprising a compound comprising at least one element selected from the group consisting of Li, B, and Si;

Y comprises a carbonate or oxide of at least one second transition metal selected from the group consisting of W, Ta, and Mo;

Z comprises at least one rare-earth element selected from the group consisting of Y, Sc, Pr, Nd, Sm, Eu, Gd, Tb, Dy, Ho, Er, Tm, Yb and Lu;

$0<a<0.06$; $0.0001<b<0.15$; $0<c<0.06$; $0<d<0.06$; $0 \le x \le 1$; $0 \le y \le 1$; $0.1<u<0.8$; $0 \le v \le 0.2$; and $0.98 \le m \le 1.02$.

A particular advantage of the instant invention is the lack of degradation of ESR at high voltage or temperature when measured at a frequency such as 50 kHz or when measured at a frequency from 10 Hz to no more than 1 MHz and more preferably a frequency from 20 kHz to no more than 200 kHz. ESR degradation causes an increase in local heating which can further degrade the capacitor. By minimizing, or eliminating, ESR degradation the capacitor remains stable after many cycles of high AC $V_{PP}$ or extended periods of time at high AC $V_{PP}$. ESR degradation due to the dielectric is best observed at lower frequencies where this is the dominant component of the ESR.

A particular advantage of the instant invention is the ability to improve thermal dissipation management in electronic devices. Inventive capacitors, with different capacitance, can be incorporated in electrical parallel. The capacitor with the higher capacitance will dissipate the most Real Power as shown by the relationship of Equation 6. Therefore, the capacitor with a higher capacitance can be physically positioned for improved heat dissipation.

Figure 6:
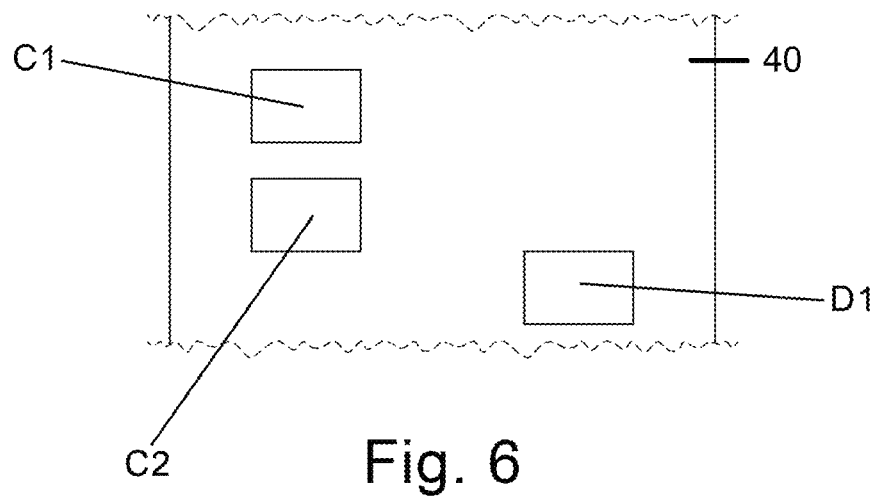
FIG. 6 illustrates an embodiment of the invention in schematic view.

In addition to the ESR stability, further advantages of the instant invention are illustrated in FIG. 6 wherein an electronic device, 40, is illustrated in partial cut-away schematic view. In FIG. 6, the electronic device comprises two capacitors, C1 and C2, in electrical parallel. If C1 increases in temperature the capacitance decreases as does the current, based on the relationship of Equation 3, which causes the temperature of C1 to decrease due to the negative thermal coefficient of capacitance of the VEU2J dielectric. Therefore, C1 is self correcting with regards to temperature increase. Unfortunately, the decrease in current in C1 causes the current to increases at C2. A thermal dissipation component, D1, positioned closer to C2 dissipates the heat from C2 which allows the combination of C1 and C2 to handle more current without heat buildup. As would be realized, thermal dissipation components can be strategically located in the vicinity of various capacitors, particularly capacitors in electrical parallel, to increase the ability of the combination of capacitors to handle more current. The thermal dissipation component is not particularly limited herein with passive devices, such as a heat sink, or active devices, such as devices which move a flowing medium or provide physical cooling, suitable for demonstration of the invention.

EXAMPLES

Figure 7:
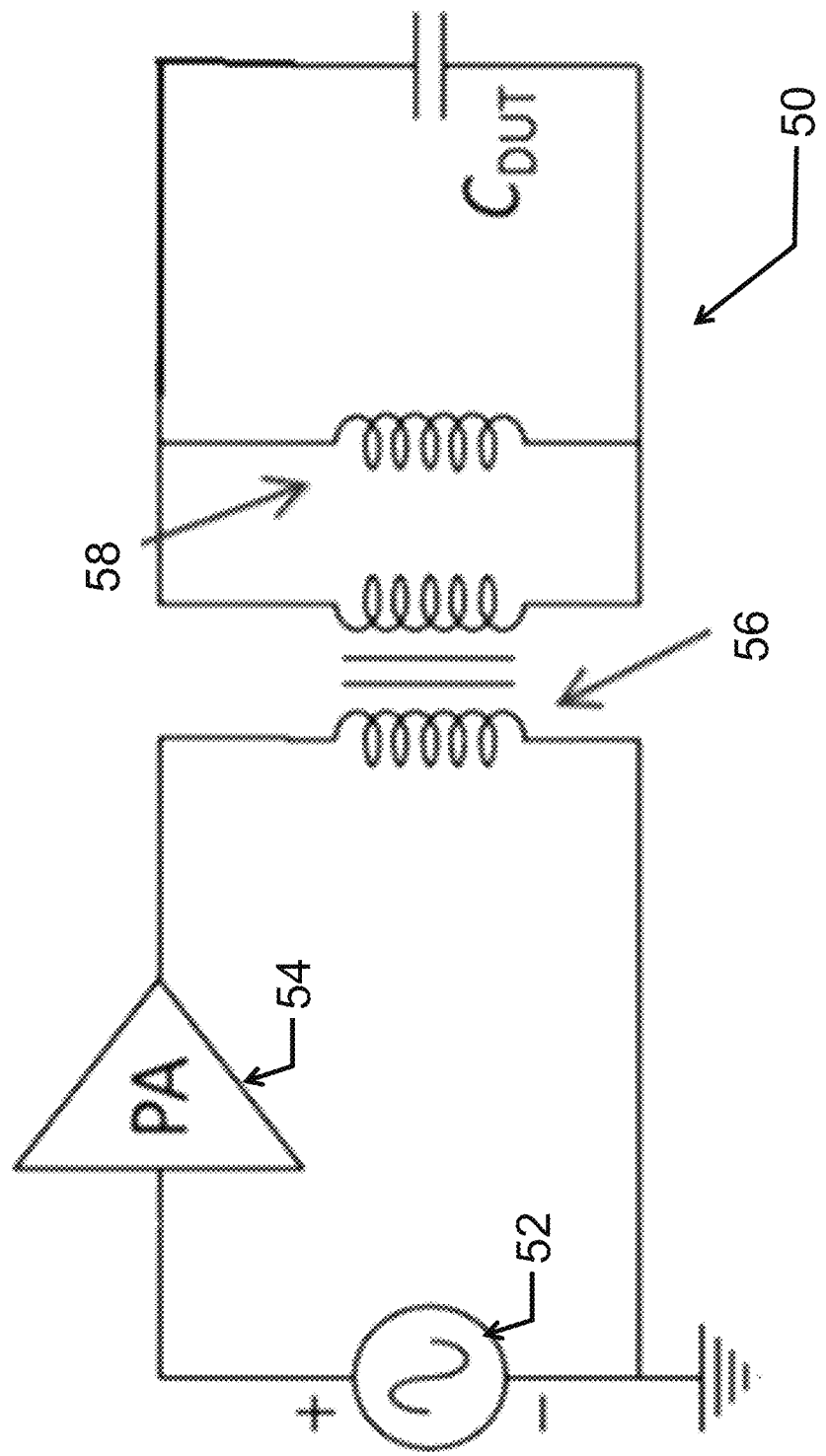
FIG. 7 illustrates a schematically a ripple current testing circuit.

To assess the comparative ripple current heating the capacitors being tested were mounted on similar test coupons and the top surface temperatures were measured. This test apparatus is illustrated in schematically FIG. 7. In FIG. 7, the test apparatus, 50, comprises a sine wave generator, 52, a power amplifier, 54, a coil auto-transformer, 56, and an impedence matching unductance coil, 58, all in a circuit as illustrated schematically with the device under test (DUT).

The test apparatus design is based on the principle of inductor-capacitor resonance. A device under test (DUT) is selected, and inductance is matched to insure the assembly's resonance frequency is appropriate for the testing conditions. While under excitation, the device temperature is taken on the top of the DUT which is the highest temperature spot. The ambient temperature is also measured continuously as a function of time. The difference between the device temperature and the ambient is reported.

The Effective Series Resistance (ESR) and Impedance (Z) measurements were acquired on a Keysight E4990A impedance analyzer with custom-made fixturing. Custom fixturing was used to provide mitigation of electromagnetic coupling between the voltage and current connections that are used to measure the DUT. The electromagnetic coupling is mitigated by making the current and voltage traces to the DUT perpendicular to one another as they approach the DUT.

This decoupling is particularly necessary in measuring Class 1 parts made with paraelectric dielectrics to more accurately characterize their very low ESR values. The custom fixturing also allows the part to be soldered to the test fixture to reduce contact resistance and to simulate the way it would be used in practice. The traces are routed from the DUT pads on the top side to vias which connect to the back of the fixturing where they are terminated with MMCX connectors. Four short cables are used to connect the MMCX connectors on the back of the fixture to BNC connector on the front of the fixture. The measurement cables are made as short as possible to reduce any potential phase error and to increase the bandwidth of the setup.

Four separate fixtures are used in the measuring process, three for compensation and one for the DUT. Open, Short and Load fixtures are used to compensate for the parasitic residuals from the wires and fixturing used to measure the DUT. The open compensation uses the fixture as-is without a DUT or any other components soldered to the pads. The short compensation uses a copper shorting block approximately the same dimensions as a typical DUT which is soldered to the fixture pads. The load compensation uses a 50-0 resistor soldered to the fixture pads to create a stable impedance across all measurement frequencies.

The fixture can be placed in an oven and used to measure ESR at elevated temperatures. The same fixturing and setup is used except for the measurement cables to connect the fixture and analyzer. High-temperature, 1-m cables were used so that the fixturing can be placed inside a Sun Systems chamber. The compensation is done at room temperature, typically 25° C. Then, the chamber is set to the desired test temperature and the DUT is left to soak for 10 minutes. Once the DUT temperature has reached steady state, the ESR of the DUT is measured and the temperature is adjusted to next temperature point. This process is repeated until the temperature rating of the DUT is reached. As needed, the compensation can be re-verified at each measurement temperature.

Figure 8:
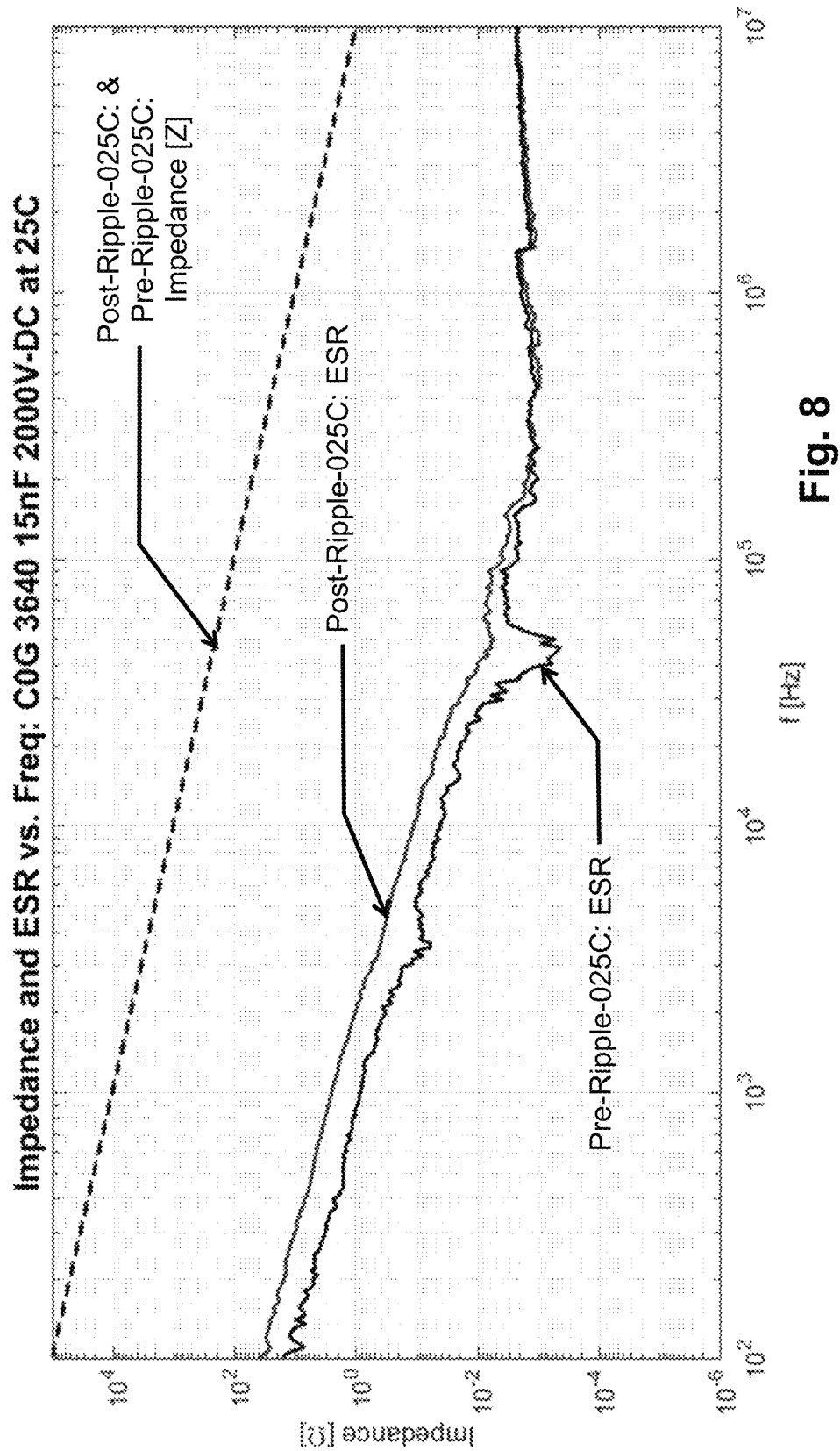
FIG. 8 graphically illustrates a prior art example.
Figure 9:
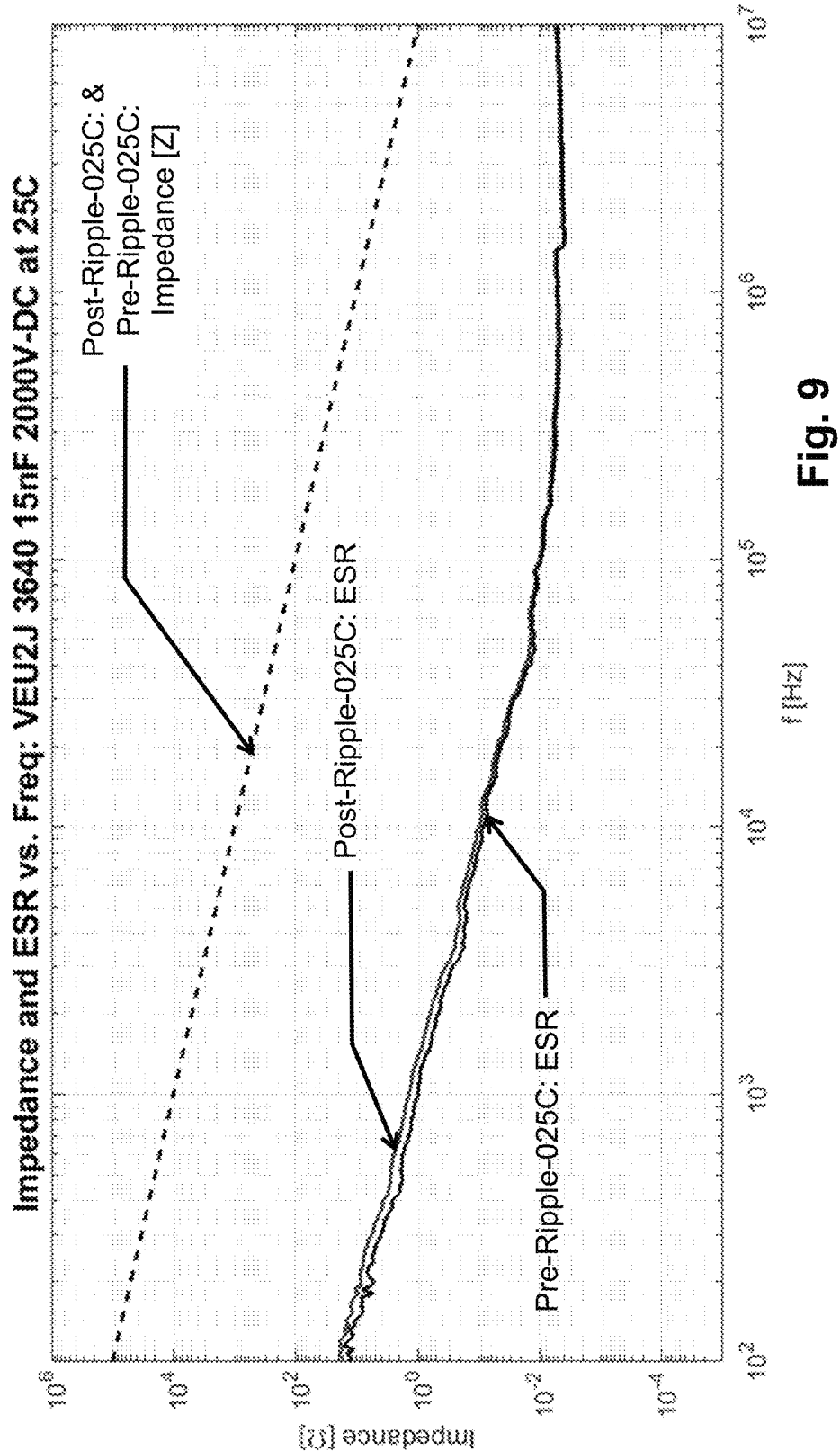
FIG. 9 graphically illustrates and embodiment of the invention.

The pre and post ripple current ESR measurements are shown for the single print C0G (6 $A_{rms}$ 750 $V_{rms}$) and double print VEU2J (10 $A_{rms}$ 1250 $V_{rms}$) in FIGS. 8 and 9 respectively.

The expected temperature rise at a distant time is projected with a power curve fit as in Equations 8 & 9 wherein A and B are summarized in the tables for all examples. If there is minimal increase in temperature rise as a function of time, the fit weakens.

$$\text{Temperature} = A * Time^B \quad \text{Equation 8}$$

$$\text{Time} = \sqrt[B]{\text{Temperature}/A} \quad \text{Equation 9}$$

Figure 10:
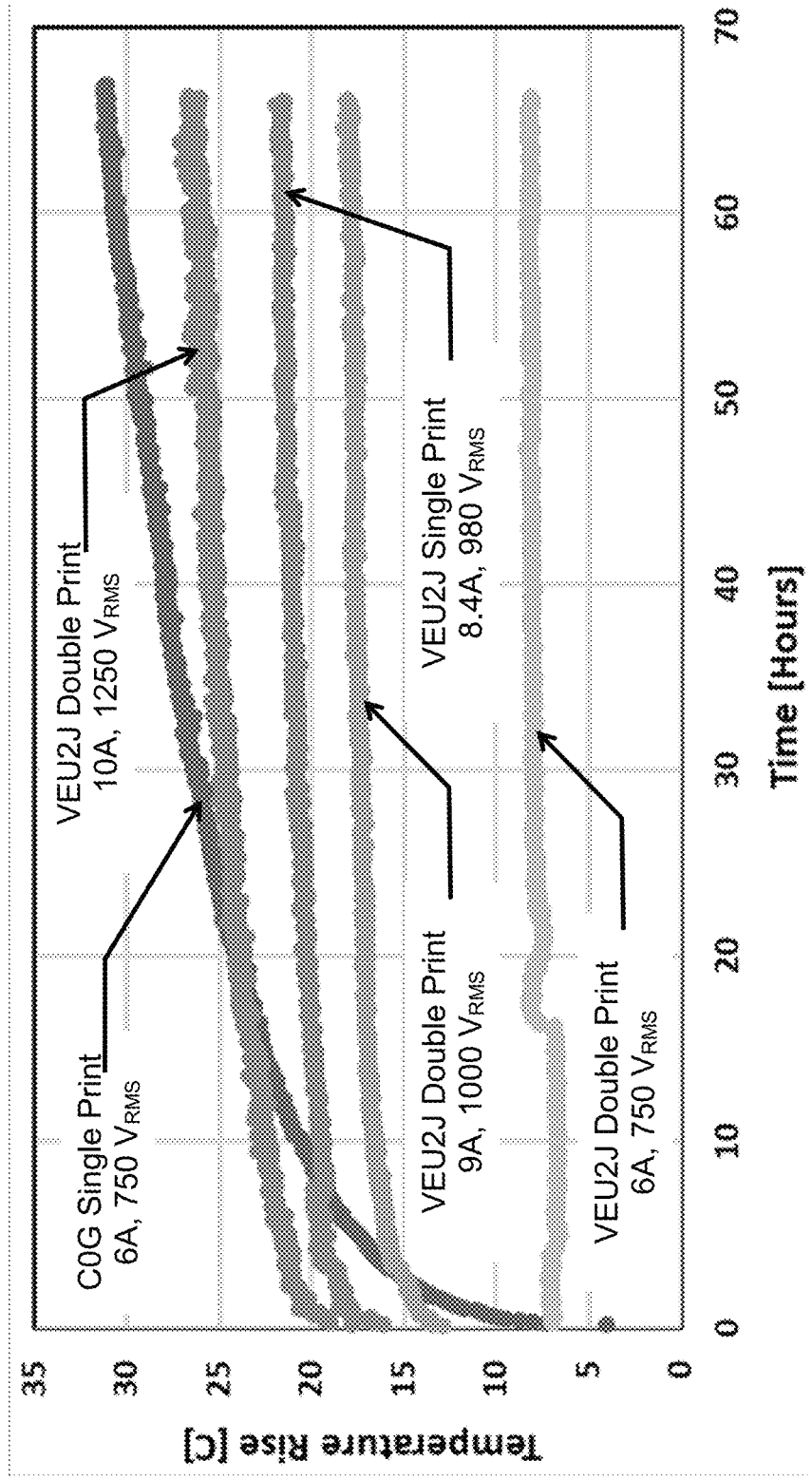
FIG. 10 graphically illustrates ripple current heating.

A series of MLCC'S were manufactured using C0G, as a control, and VEU2J dielectrics as described herein. Comparative ripple current tests were run under different conditions using the test fixtures describe above. A summary of the MLCC's tested is provided in Table 1.

various currents and temperatures as shown in FIG. 10. The electrical properties of these MLCC are show in Table 2.

TABLE 2

| Dielectric Type | Cap (nF) | DF (%) | IR @25° C. (GOhms) | IR @125° C. (GOhms) | Mean Voltage Breakdown ($V_{dc}$) |
|---|---|---|---|---|---|
| C0G | 14.87 | 0.018 | 5471 | 4.2 | 3888 |
| VEU2J | 15.79 | 0.013 | 1300 | 7.9 | 4061 |

These electrical properties are typical for MLCCs with a rated DC voltage of 2000 $V_{dc}$. In Table 2 the mean breakdown voltage of the VEU2J Capacitor slightly exceeded that of the C0G capacitor but the minimum voltage breakdowns are very similar with a mean 3 sigma for C0G of 3718V compared to 3751V for VEU2J.

In both cases the C0G and U2J can be rated as 2000 Vdc to achieve an AC rating of 707 $V_{rms}$ based on the expected relationship of Equation 7. However, when AC Voltages are applied to each MLCC, contrary to the expectations based on theory, the VEU2J MLCC does not exhibit the self-heating expected at these and higher voltages, FIG. 10. It is important to note that in the case of the C0G the 6 $A_{rms}$, 750 $V_{rms}$ applied results in the temperature reaching 25° C. above ambient after about 24 hours. This AC voltage level is slightly above the 707 $V_{rms}$ limit in accordance with Equation 7. The single print version of this VEU2J part does not heat up as much at 8.4 $A_{rms}$, 980 $V_{rms}$ despite having fewer electrodes than the C0G. The fewer number of electrodes inhibits the conduction of heat from the center of the MLCC. In the case of this C0G MLCC if the AC voltage is increased to 8 $A_{rms}$ 1000 $V_{rms}$ the MLCCs heat up rapidly above the high-risk temperature range and at 10 $A_{rms}$, 1250 $V_{rms}$ the MLCC breakdown point is reached and the capacitors breakdown.

This demonstrates that the VEU2J dielectric has unexpected benefits in terms of the ripple current handling. Increasing the number of electrodes in the VEU2J MLCCs by double printing, to match the C0G capacitors, would further improve the performance. The double printed VEU2J MLCC remains at 25° C. after 24 hours at 10 $A_{rms}$ 1250 $V_{rms}$

TABLE 1

| Comparison Example # | Dielectric | EIA Case Size | Nominal Cap. (nF) | DC Voltage rating ($V_{dc}$) | Fired Dielectric Thick (μm) | Artwork | Single/ Double Print | # Electrodes |
|---|---|---|---|---|---|---|---|---|
| 1 | C0G | 3640 | 15 | 2000 | 25 | 2-Serial | Single | 73 |
|  | VEU2J | 3640 | 15 | 2000 | 38 | 2-Serial | Single | 49 |
|  | VEU2J | 3640 | 15 | 2000 | 38 | 2-Serial | Double | 90 |
| 2 | C0G | 1210 | 15 | 1000 | 13 | Standard | Single | 118 |
|  | VEU2J | 1210 | 15 | 1000 | 23 | Standard | Single | 92 |
| 3 | C0G | 1206 | 10 | 630 | 10 | Standard | Single | 120 |
|  | VEU2J | 1206 | 10 | 630 | 15 | Standard | Single | 73 |
| 4 | C0G | 1210 | 33 | 630 | 10 | Standard | Single | 202 |
|  | VEU2J | 1210 | 33 | 630 | 15 | Standard | Single | 130 |

The ripple current testing comparison examples are described below.

Example 1

A series of EIA case size 3640 15 nF MLCCs with a rated DC voltage of 2000 $V_{dc}$ were manufactured using C0G and VEU2J dielectrics as described in Table 1. The ripple current heating of these MLCCs were measured at 85 kHz under which is 1.77 higher than the recommended AC voltage limit based on Equation 7. Furthermore, although the temperature of the VEU2J MLCCs increase rapidly at these high AC Voltages the temperature remains stable with time. This stability with temperature can only partially be explained by the difference in change of capacitance with temperature described earlier. Since the real power dissipated is directly proportional to ESR, as shown in Equation 4, the ESR and impedance were measured before and after exposure to ripple current. With the post exposure parts the C0G sample had been exposed to 6 $A_{rms}$ at 750 $V_{rms}$ whereas the VEU2J sample had been exposed to 10 $A_{rms}$ and 1250 $V_{rms}$.

Despite the VEU2J sample being tested at far higher ripple current the post test ESR shows only a small change whereas the post test ESR of the C0G sample is significantly higher. This increased ESR on exposure to high ripple current contributes to the increase in temperature observed.

Example 2

Figure 11:
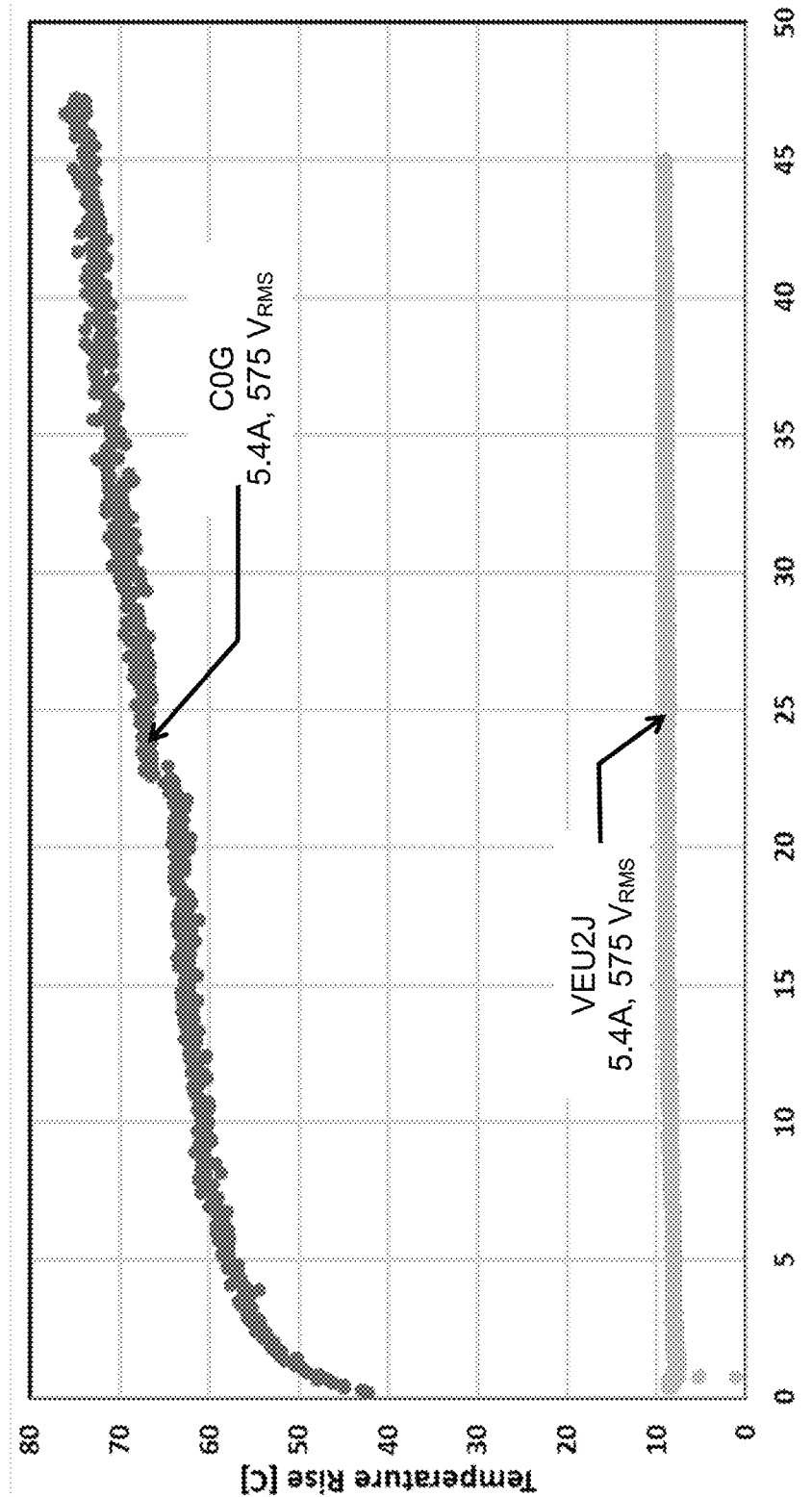
FIG. 11 graphically illustrates a comparison of a control and an embodiment of the invention.

A series of EIA case size 1210 15 nF MLCCs with a rated DC voltage of 1000$V_{dc}$ were manufactured using C0G and VEU2J dielectrics. The ripple current heating of these MLCCs were measured at 100 kHz using the test method previously described and the results are shown in FIG. 11.

Under the same conditions, the VEU2J MLCCs remain in the safe range of ripple current heating whereas the C0G MLCCs rapidly heat-up to over 50° C. above ambient. This AC voltage is far higher than the 353 $V_{rms}$ expected according to Equation 7 but the VEU2J MLCC's do not exhibit significant ripple current heating.

To further understand these differences Impedance and ESR measurements were made over a broad frequency range on MLCCs before exposure to this high AC voltage and the results were compared to the MLCC post-exposure. Measurements were also made at elevated temperatures using the aforementioned test method.

Figure 12:
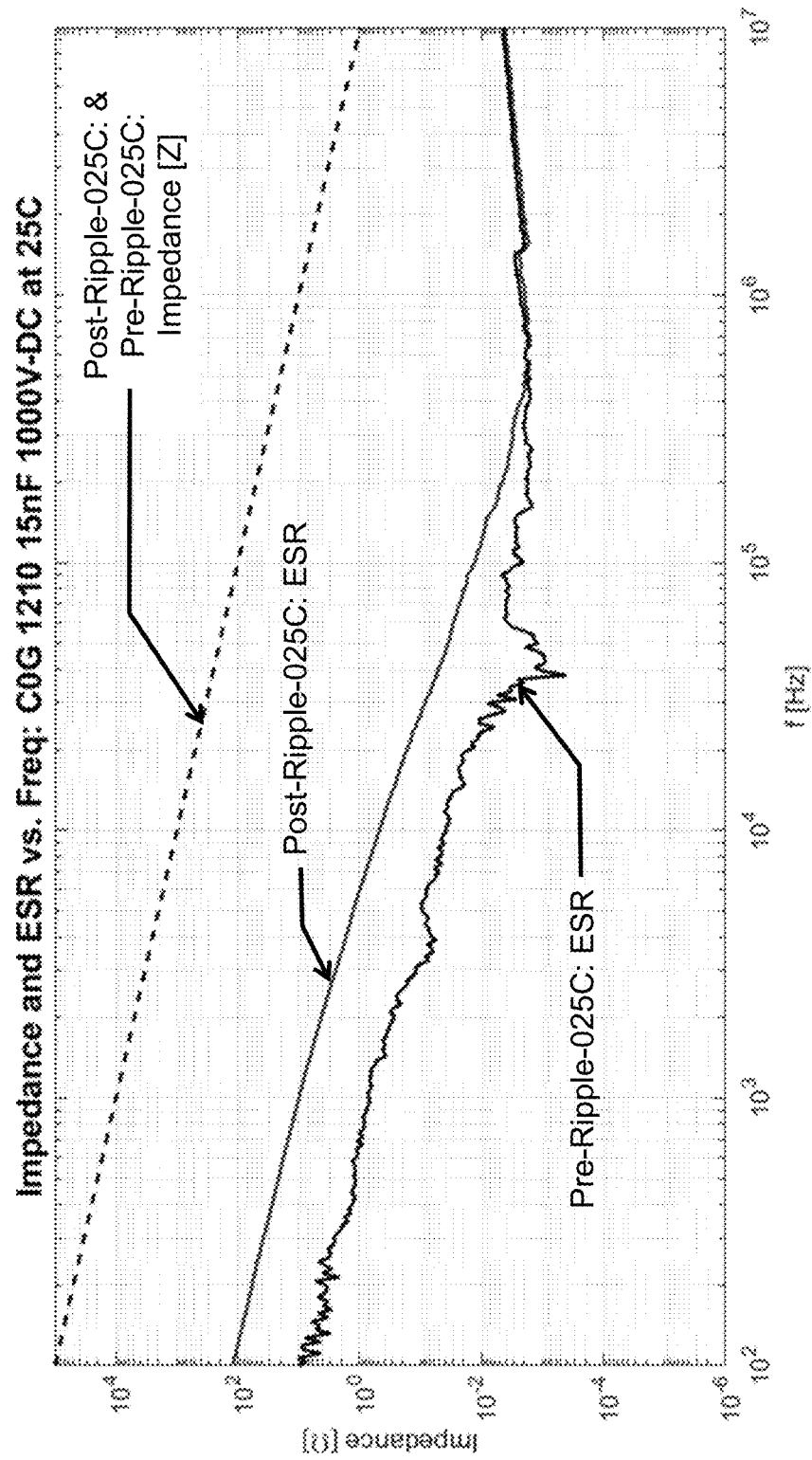
FIG. 12 graphically illustrates a prior art example.
Figure 13:
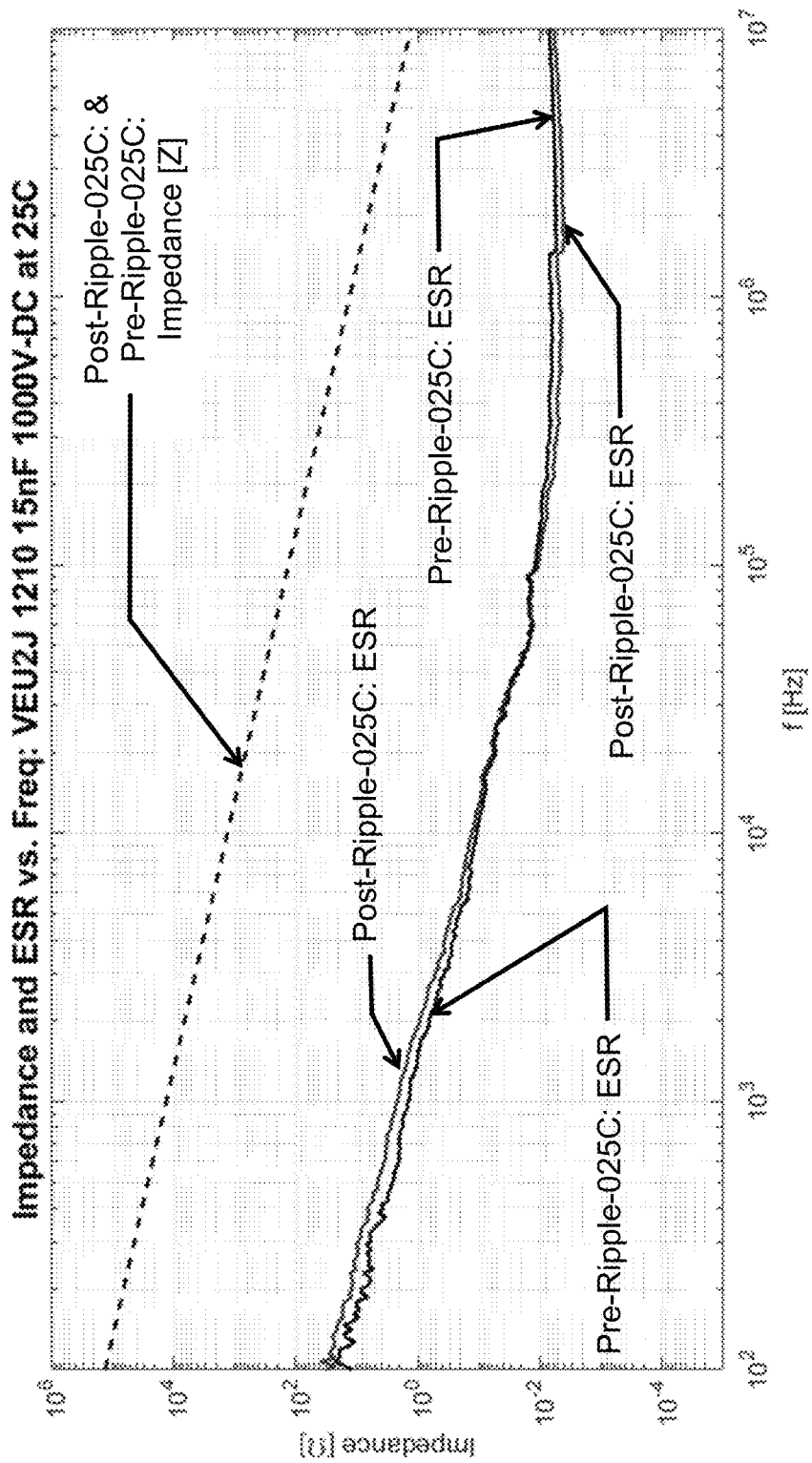
FIG. 13 graphically illustrates an embodiment of the invention.

The ESR results obtained at ambient temperatures for the 15 nF C0G and VEU2J MLCC's are shown in FIGS. 12 and 13, respectively.

Figure 14:
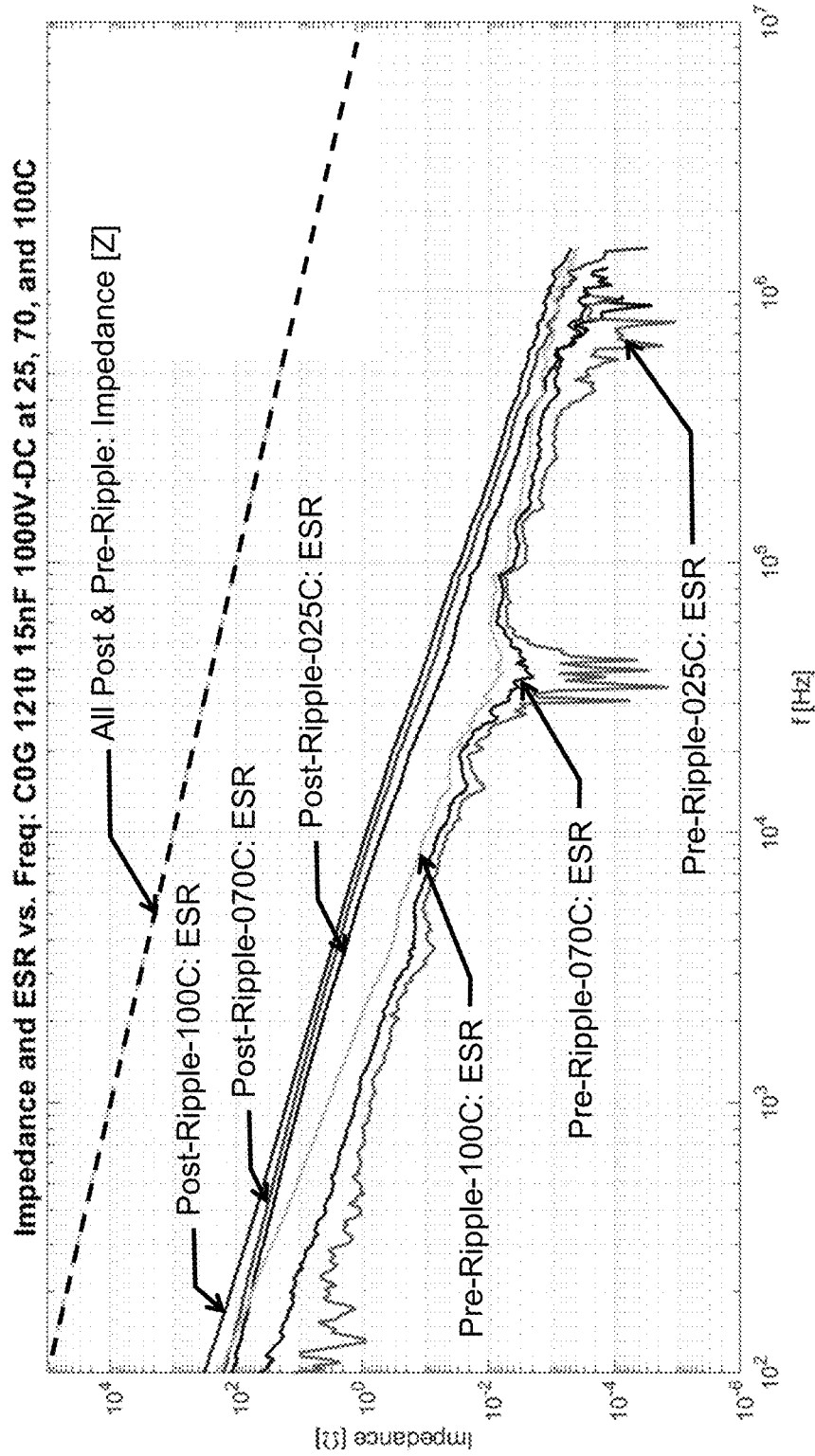
FIG. 14 graphically illustrates a prior art example.
Figure 15:
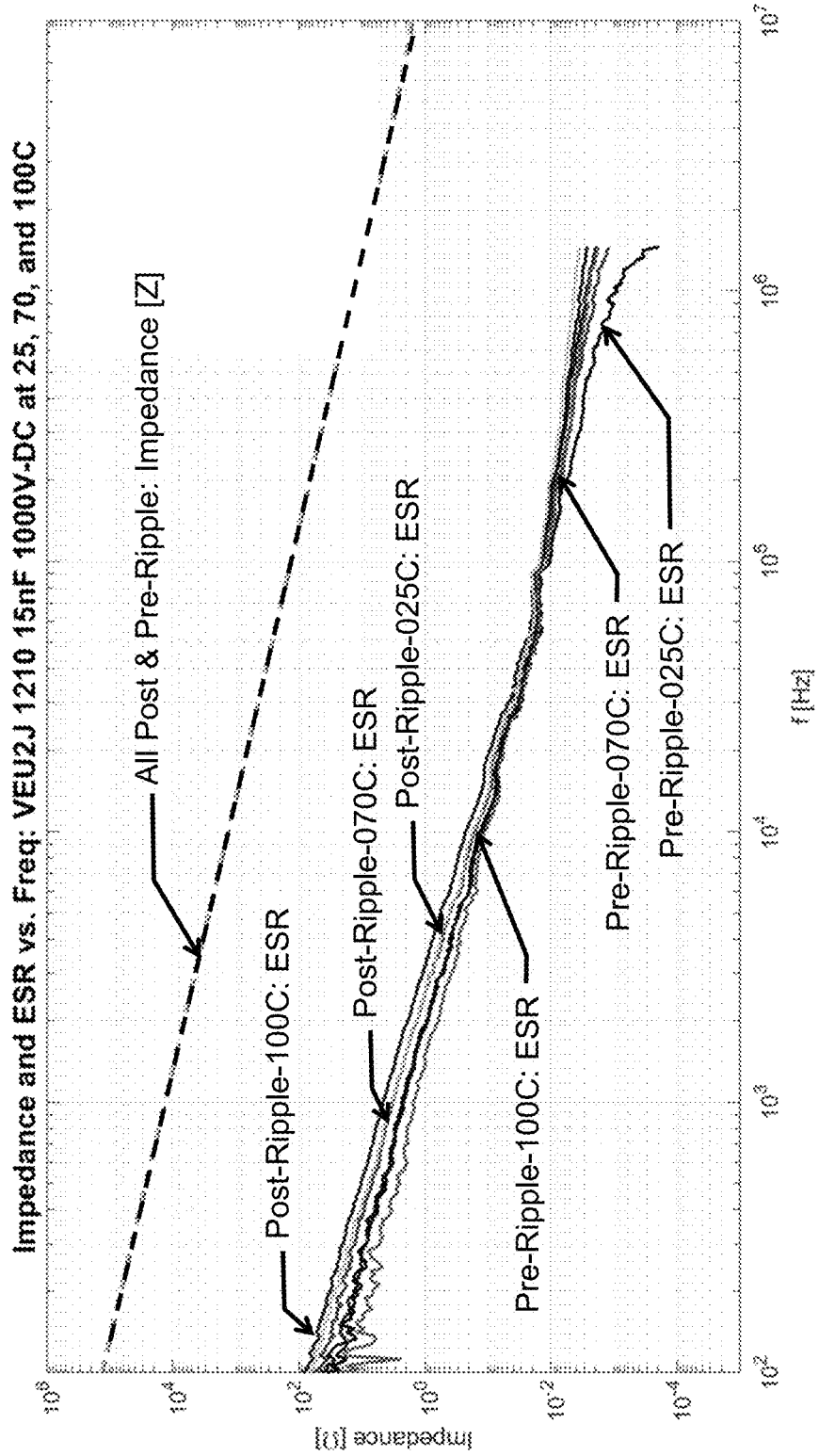
FIG. 15 graphically illustrates an embodiment of the invention.

The impedance values are not significantly affected by exposure to high AC Voltage whereas in the case of the C0G capacitors, at frequencies of less than 1 MHz, the ESR post-exposure can be 10 times higher than the pre-exposure ESR or above an order of magnitude. In the case of the VEU2J capacitors the ESR remains very similar in the post-exposure MLCC at less than two times increase at any frequency. This is very critical for ripple current heating since the Real Power dissipated is directly proportional to ESR as indicate by Equation 4. Measurements were also made pre (virgin) and post-exposure up to 100° C. Examples of these measurements over a broad frequency range are shown in FIGS. 14 and 15 respectively.

Figure 16:
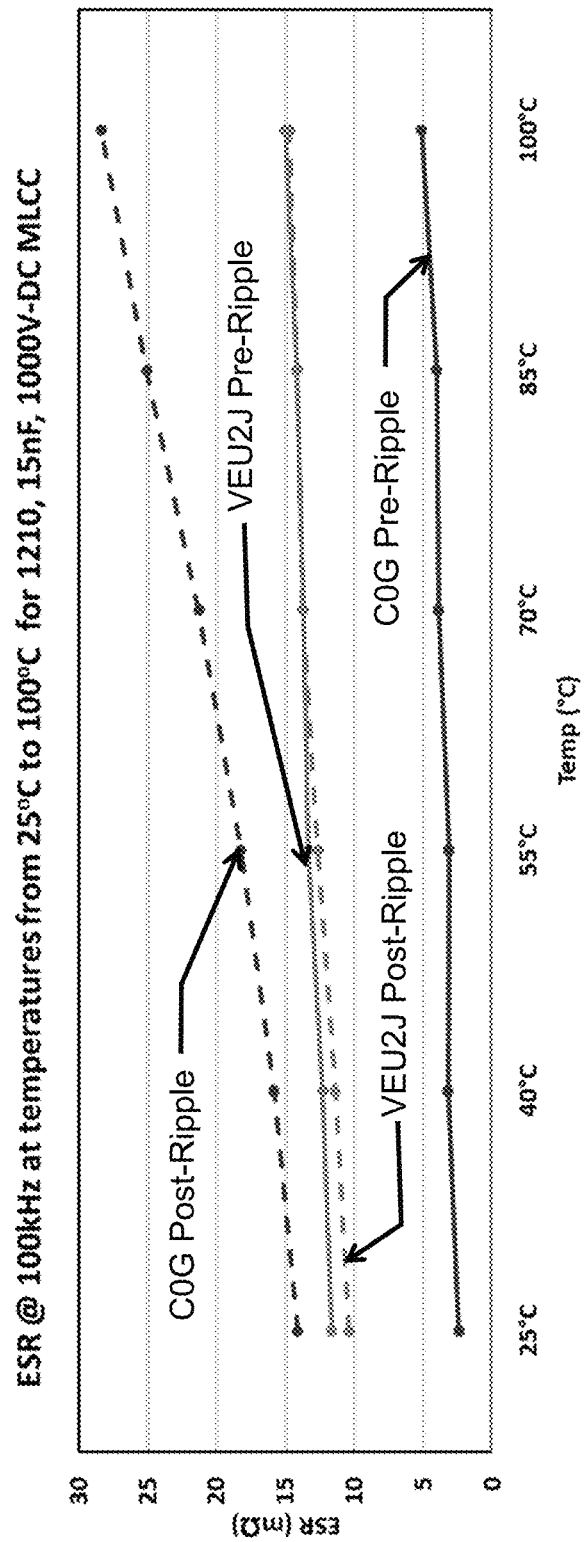
FIG. 16 graphically illustrates a comparison of a prior art example and an embodiment of the invention.

At higher temperatures there is little difference in the pre (virgin) and post-exposure ESR data for VEU2J capacitors. This can be seen more clearly by extracting the ESR data measured at different temperatures at 100 kHz as shown in FIG. 16.

At 100 kHz the ESR of the post-exposure VEU2J capacitor barely changes with increased temperature whereas the ESR of the post exposure C0G capacitor is increased by over 5 times at 100° C. compared to the pre-test part.

Example 3

Figure 17:
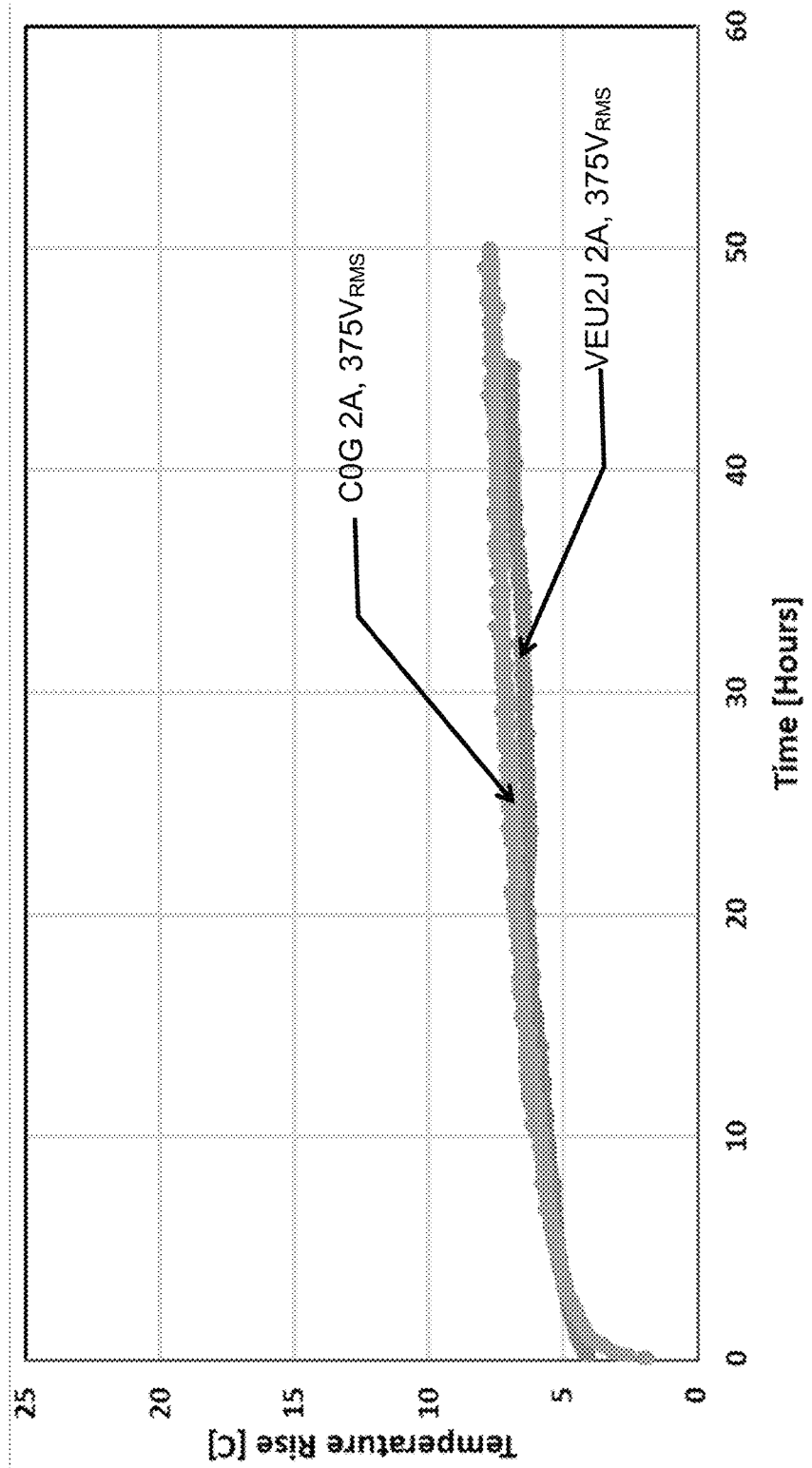
FIG. 17 graphically illustrates a test condition.

A series of EIA case size 1206 10 nF MLCCs with a rated DC voltage of 630 $V_{DC}$ were manufactured using C0G and VEU2J capacitors. The ripple current heating of these MLCCs were measured at 85 kHz using the test method previously described. In this case the heating of the parts is similar as shown in FIG. 17.

Although the ripple current heating appears similar the temperature of the VEU2J capacitors has a slower rate of increase with time so the parts do not reach 25° C. as quickly as the C0G capacitors.

Example 4

Figure 18:
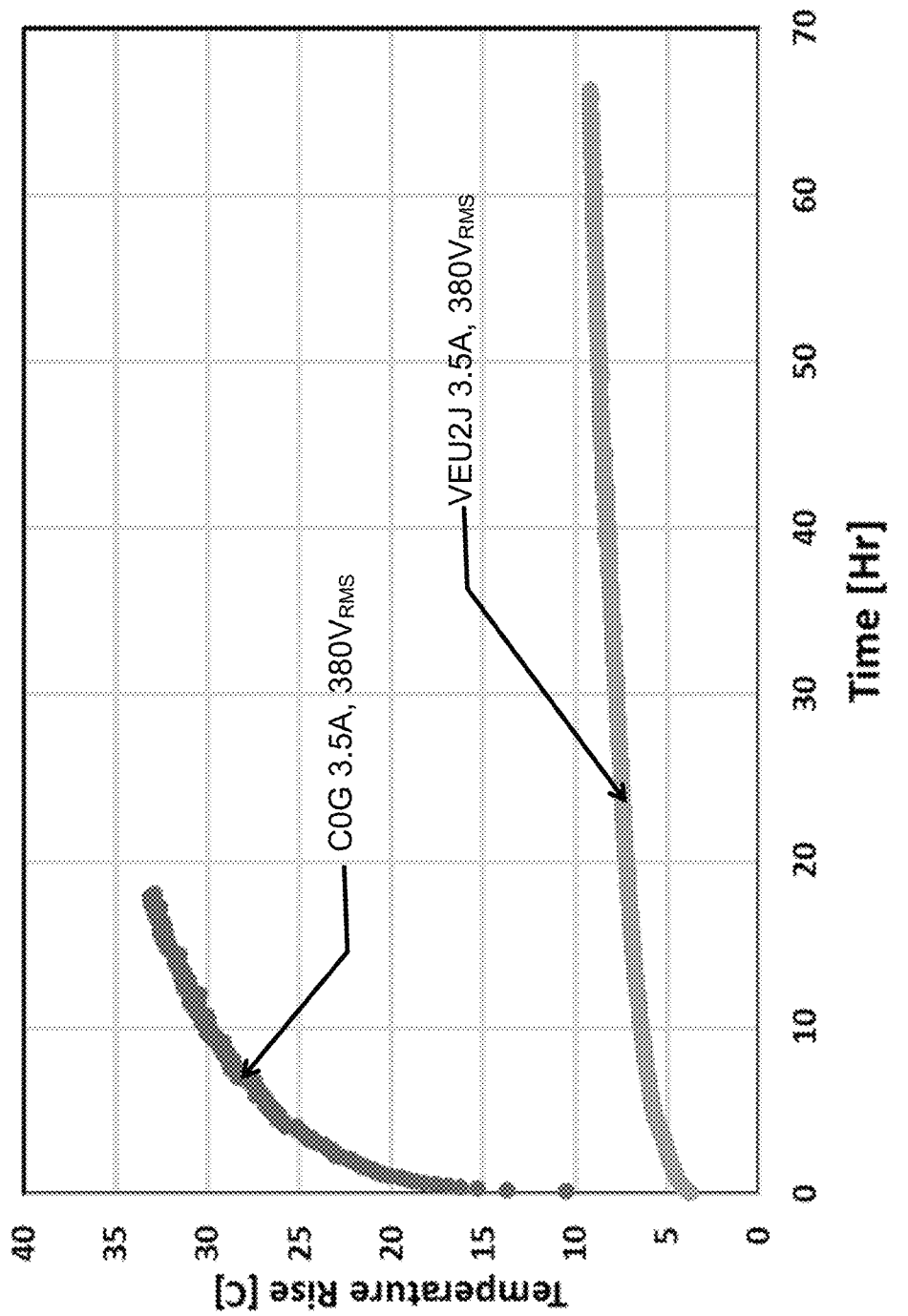
FIG. 18 graphically illustrates a comparison of a prior art example and an embodiment of the invention.

A series of EIA case size 1210 33 nF MLCCs with a rated DC voltage of 630 $V_{DC}$ were manufactured using C0G and VEU2J dielectrics. The ripple current heating of these MLCCs were measured at 50 kHz at an ambient temperature of 85° C. and the results are shown in FIG. 18.

Figure 19:
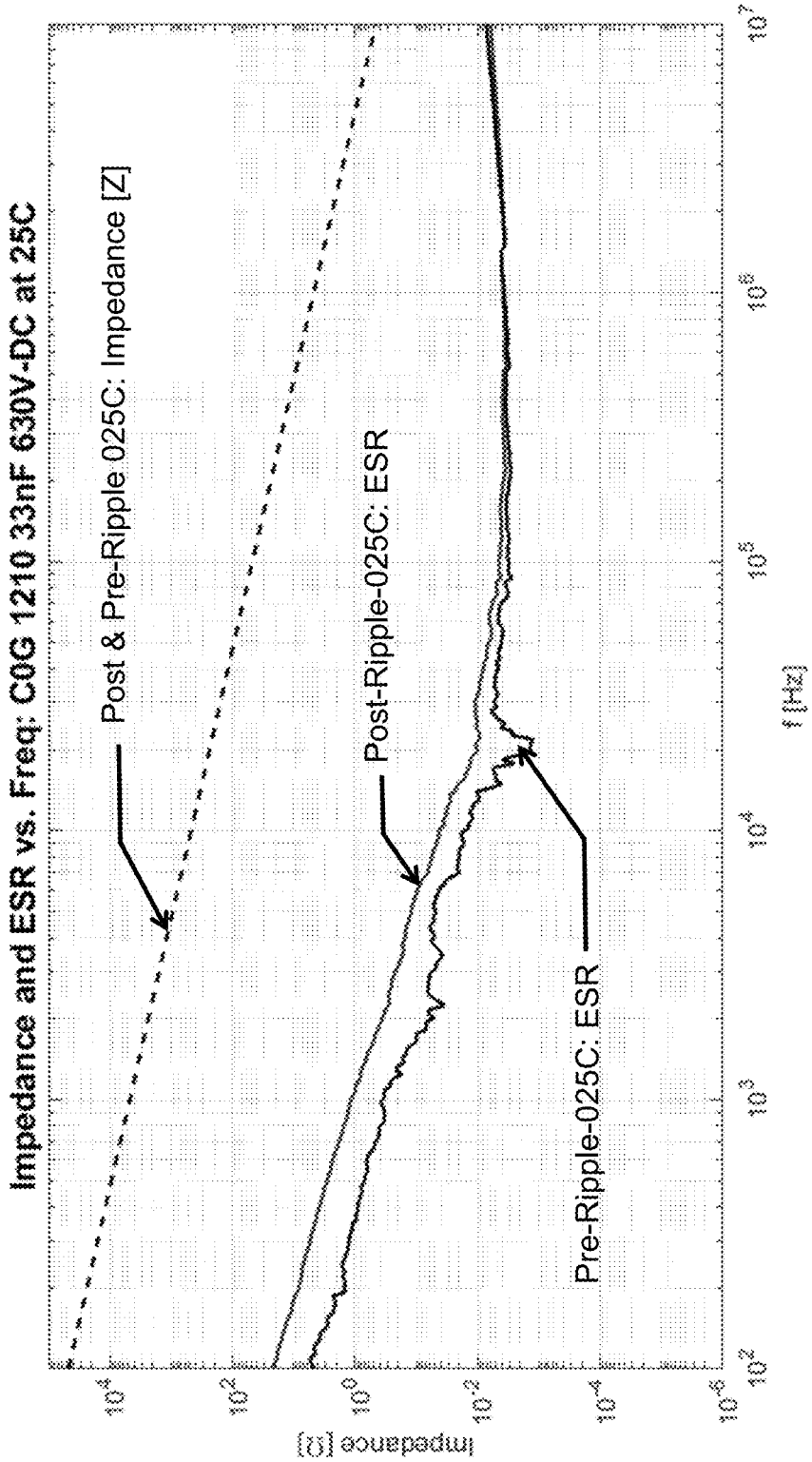
FIG. 19 graphically illustrates a prior art example.
Figure 20:
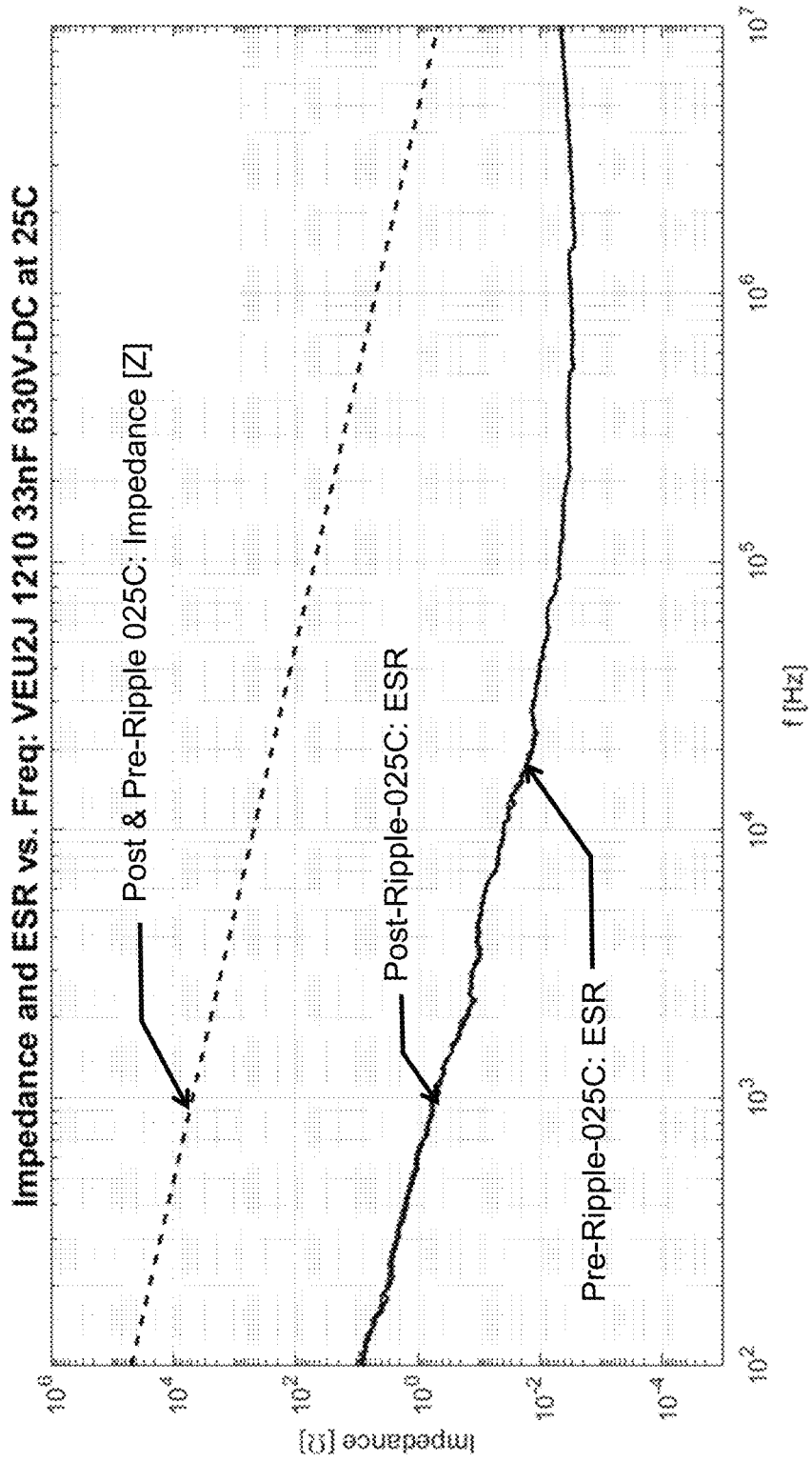
FIG. 20 graphically illustrates and embodiment of the invention.

At this elevated ambient temperature of 85° C. the ripple current heating is far less for VEU2J than for the equivalent C0G MLCC. The pre (virgin) and post ripple ESR for these parts are shown in FIGS. 19 and 20.

The results of ESR at various temperatures pre (virgin) and post ripple measured as 50 kHz is reported in Table 3.

TABLE 3

| | | ESR (mOhm) | | |
|---|---|---|---|---|
| Dielectric | Treatment | 25° C. | 85° C. | 125° C. |
| C0G | Pre(virgin) | 4.2 | 6.5 | 14.0 |
| C0G | Post Ripple | 6.5 | 10.3 | 17.3 |
| VEU2J | Pre(virgin) | 8.1 | 9.7 | 13.1 |
| VEU2J | Post Ripple | 8.3 | 9.8 | 12.9 |

As indicated in Table 3, the ESR of the C0G sample increases over 23% at all temperature and over 50% at 25° C. and 85° C. The VEU2J capacitor exhibited less than 2% increase in ESR.

To understand the rate of heating differences in the C0G vs VEU2J MLCC's all the time to temperatures of 25° C. and 50° C. using the aforementioned power curve fitting Examples 1, 2, 3 and 4 are summarized with the test conditions in Table 4 and the results in Table 5. To achieve a better curve fitting in 2 cases the surface temperatures recorded from the first 5 hours were not considered as noted.

TABLE 4

| Example | Dielectric | Print | Test AC Voltage $V_{RMS}$ | $V_{PP}$ | Test AC Current ($A_{RMS}$) | Test Frequency (kHz) | Test voltage/ Max AC voltage |
|---|---|---|---|---|---|---|---|
| 1 | C0G | single | 750 | 2114 | 6 | 85 | 1.06 |
| 1 | VEU2J | single | 980 | 2762 | 8.4 | 85 | 1.39 |
| 1 | VEU2J | double | 750 | 2114 | 6 | 85 | 1.06 |
| 1 | VEU2J | double | 1125 | 3170 | 9 | 85 | 1.59 |
| 1 | VEU2J | double | 1250 | 3523 | 10 | 85 | 1.77 |
| 2 | C0G | single | 575 | 1620 | 5.4 | 100 | 1.62 |
| 2 | VE2UJ | single | 575 | 1620 | 5.4 | 100 | 1.62 |
| 3 | C0G | single | 375 | 1057 | 2.0 | 85 | 1.68 |
| 3 | VEU2J | single | 375 | 1057 | 2.0 | 85 | 1.68 |
| 4 | C0G | single | 380 | 1071 | 3.5 | 50 | 1.70 |
| 4 | VEU2J | Single | 380 | 1071 | 3.5 | 50 | 1.70 |

TABLE 5

| Example | Dielectric | Print | Time to 25° C. (hours) | Time to 50° C. (hours) | A | B | R2 Factor (%) |
|---|---|---|---|---|---|---|---|
| 1 | C0G | single | 24 | 470 | 11.8 | 0.235 | 98.6 |
| 1 | VEU2J | single | 1560 | 4,359,845,471 | 17.4 | 0.0467 | 95.4 |
| 1 | VEU2J | double | 4,420,000 | 5,150,000,000 | 5.57 | 0.09817 | 78.3[#] |
| 1 | VEU2J | double | 43,912 | 42,976,359,107 | 14.6 | 0.0503 | 96.0 |
| 1 | VEU2J | double | 35 | 563,126 | 19.0 | 0.0715 | 96.3 |
| 2 | C0G | single | 0.0019 | 1.5 | 48.3 | 0.105 | 94.6 |
| 2 | VEU2J | single | $5.68 \times 10^8$ | $50.7 \times 10^{12}$ | 7.34 | 0.0608 | 81.0[#] |
| 3 | C0G | single | 35,000 | 1,790,891 | 3.91 | 0.177 | 98.6 |
| 3 | VEU2J | single | 1,547,441 | 414,262,132 | 4.27 | 0.124 | 94.7 |
| 4 | C0G | single | 4 | 145 | 19.3 | 0.191 | 98.5 |
| 4 | VEU2J | Single | 23,000 | 1,230,000 | 4.35 | 0.174 | 98.6 |

[#]Surface temperature data from initial 5 hours not fitted in these cases

In Example 1 the VEU2J double print MLCCs remain at 25° C. after 24 hours at 10 $A_{rms}$ 1250 $V_{rms}$ which is 1.77 times higher than the AC voltage limit based on Equation 7. Furthermore, although the temperature of the VEU2J MLCCs increase rapidly at these high AC Voltages the temperature remains stable with time. This temperature stability under applied AC Voltage is critical with respect to long term reliability. The predicted times to reach critical temperatures of 25° C. and 50° C. remain far higher for VEU2J even when the test voltages are increased compared to the C0G.

The VEU2J MLCC of Example 2 experienced far less heating than a C0G MLCC with the same nominal capacitance so their reliability under AC voltage at this frequency is much better. In the case of Example 3, even when the surface heating of the C0G and VEU2J MLCCs appears similar, the curve fitting shows that the VEU2J surface temperature does not increase as quickly with time so it will take far longer to reach the critical temperature.

Furthermore, in arrays of 2 or more capacitors of VEU2J in electrical parallel in the same circuit the higher capacitance value MLCC would have a higher proportion of the current, indicated by Equation 3, but as this heated up capacitance would be lowered and so the current shared more evenly between the 2 MLCCs. This helps distribute the current more evenly between arrays of capacitors even when these are arranged serially in a matrix.

Example 5

Figure 21:
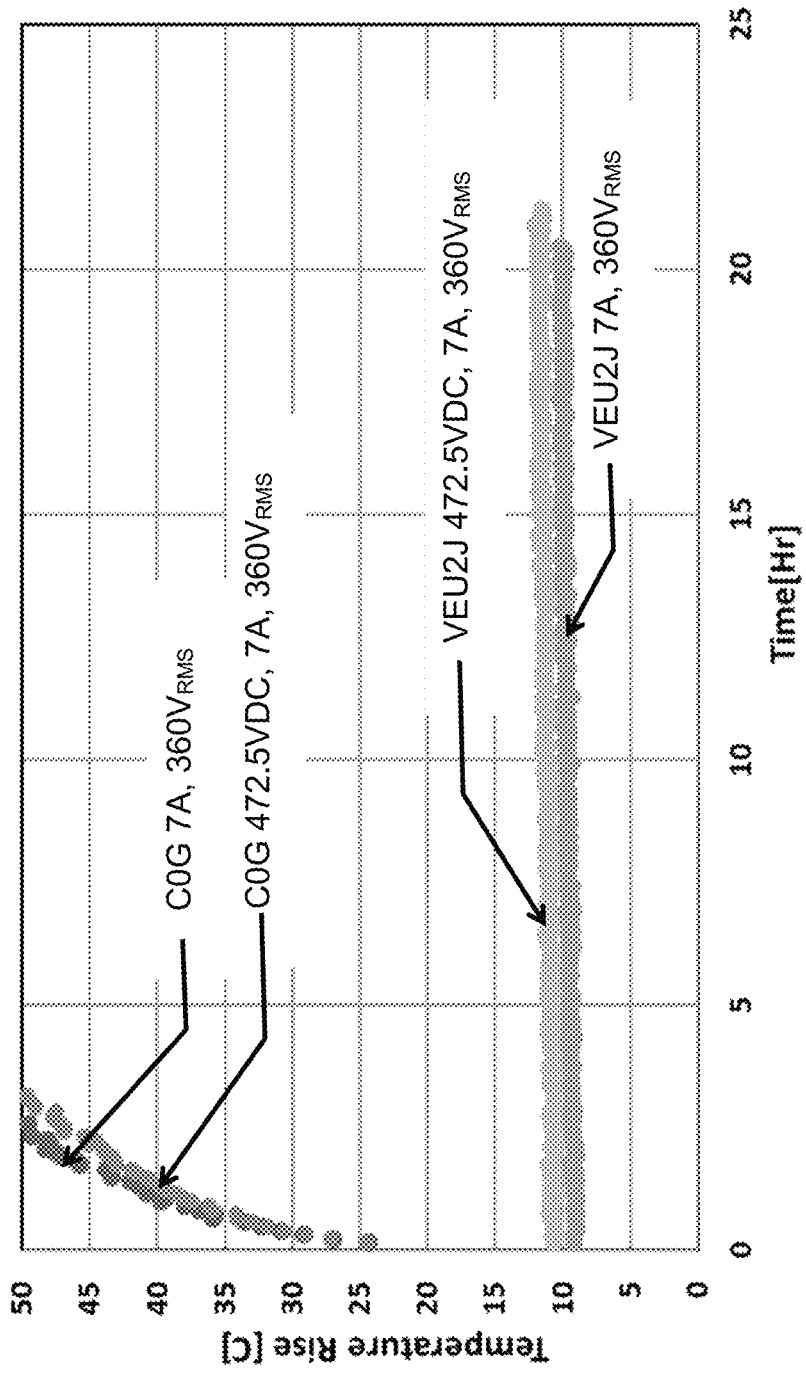
FIG. 21 graphically illustrates and embodiment of the invention.

A series of EIA case size 1210 33 nF MLCCs with a rated DC voltage of 630$V_{DC}$ manufactured using C0G and VEU2J dielectrics were mounted on a test board. The ripple current heating was measured for both types of dielectrics at 100 kHz with and without a DC bias voltage of 472.5V applied at 25° C. The temperature rise as a function of time was measured and is shown in FIG. 21.

Figure 22:
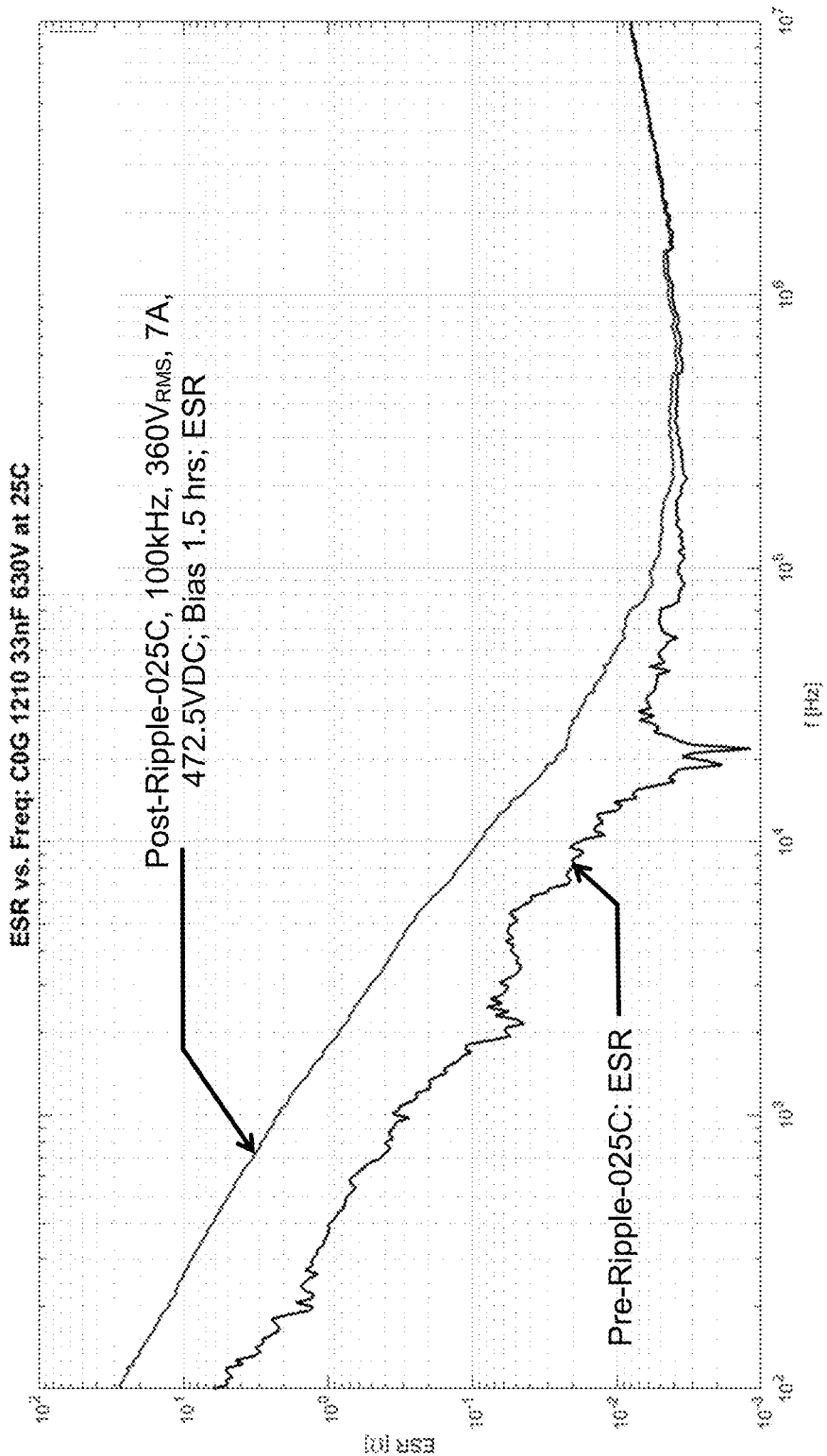
FIG. 22 graphically illustrates a prior art example.
Figure 23:
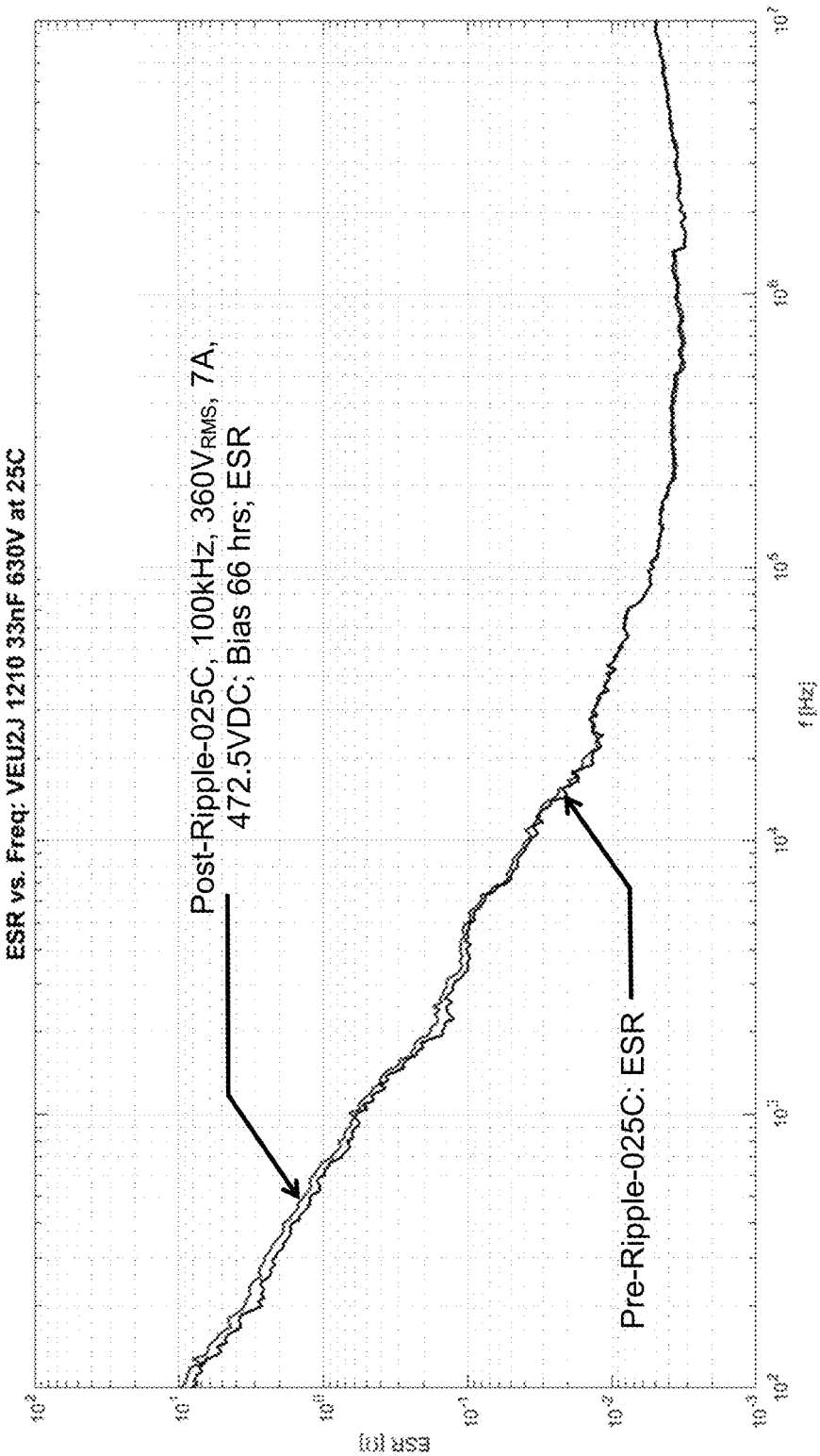
FIG. 23 graphically illustrates and embodiment of the invention.

The C0G MLCCs failed short as the test was continued. The same C0G MLCC was exposed for a shorter time of 1.5 hours under the same conditions with DC Bias voltage applied at an ambient temperature of 25° C. to allow ESR changes to be assessed. The pre(virgin) and post ripple ESR for the C0G are compared after 1.5 hours exposure to this ripple current and bias is shown in FIG. 22. As already shown in the other examples of exposure to pure AC voltages the ESR increased significantly even when DC bias was applied. Ripple current testing of the VEU2J MLCC with the biased voltage applied was continued for 66 hours but no further increase in temperature was detected. The pre(virgin) and post ripple ESR for these VEU2J MLCCs are shown in FIG. 23. Despite this long exposure no increase in ESR was detected in the VEU2J MLCC.

These results show that the VEU2J heats up less than C0G even when a DC bias voltage is applied in addition to the AC ripple voltage.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. An electronic device comprising:
a first multilayer ceramic capacitor comprising:
first conductive plates electrically connected to first external terminations and second conductive plates electrically connected to second external terminations wherein said first conductive plates and said second conductive plates form a capacitive couple; and
a ceramic portion between said first conductive plates and said second conductive plates wherein said ceramic portion comprises paraelectric ceramic dielectric;
wherein said multilayer ceramic capacitor has a rated DC voltage and a rated AC $V_{PP}$ wherein said rated AC $V_{PP}$ is higher than said rated DC voltage; and
a second multilayer ceramic capacitor.

2. The electronic device of claim 1 further wherein said first multilayer ceramic capacitor and said second multilayer ceramic capacitor are in electrical parallel.

3. The electronic device of claim 2 wherein said first multilayer ceramic capacitor has a higher capacitance than said second multilayer ceramic capacitor.

4. The electronic device of claim 3 wherein said electronic device further comprises a thermal dissipation element.

5. The electronic device of claim 4 wherein said thermal dissipation element is closer to said first capacitor than said second capacitor.

6. The electronic device of claim 1 wherein said first multilayer ceramic capacitor and said second multilayer ceramic capacitor are in electrical series.

7. The electronic device of claim 6 wherein said first multilayer ceramic capacitor has a higher capacitance than said second multilayer ceramic capacitor.

8. The electronic device of claim 7 wherein said electronic device further comprises a thermal dissipation element.

9. The electronic device of claim 8 wherein said thermal dissipation element is closer to said first capacitor than said second capacitor.

10. The electronic device of claim 1 wherein said rated AC $V_{PP}$ is 950 $V_{PP}$ to 5700 $V_{PP}$.

11. The electronic device of claim 1 wherein said paraelectric ceramic dielectric is defined by General Formula A:

$$(Ca_eSr_g)_j(Zr_kTi_p)_qO_3 \quad \text{General Formula A}$$

wherein:
e=0.60 to 1.00;
g=0.00 to 0.40;
k=0.50 to 0.97;
p=0.03 to 0.50; and
j/q=0.99 to 1.01.

12. The electronic device of claim 11 wherein at least 90 mole % of said ceramic portion is said paraelectric ceramic dielectric defined by General Formula A.

13. The electronic device of claim 11 wherein said Ca or Zr are substituted with Ba or Mg.

14. The electronic device of claim 11 wherein said Zr or Ti are substituted with Hf.

15. The electronic device of claim 11 wherein said paraelectric ceramic dielectric further comprise a secondary component comprising at least one element selected from the group consisting of Zn, Cu, Ni, Co, Fe, Mn, Cr, Al, Li, B, Si, W, Ta, Mo, Y, Sc, La, Ce, Pr, Nd, Sm, Eu, Gd, Tb, Dy, Ho, Er, Tm, Yb and Yu.

16. The electronic device of claim 15 wherein said paraelectric ceramic dielectric comprises at least 0.5 mole % of said secondary component.

17. The electronic device of claim 1 wherein said paraelectric ceramic dielectric is defined by General Formula B:

$$U_aX_bY_cZ_d((Ca_{1-x-y}Sr_xM_y)_m(Zr_{1-u-v}Ti_uHf_v)O_3)_{1-a-b-c-d} \quad \text{General Formula B}$$

wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
Z comprises at least one rare-earth element selected from the group consisting of Y, Sc, La, Ce, Pr, Nd, Sm, Eu, Gd, Tb, Dy, Ho, Er, Tm, Yb and Lu;
0<a<0.06;
0.0001<b<0.15;
0<c≤0.06;
0<d<0.06;
0≤x≤1;
0≤y≤1;
0≤u≤1;
0≤v≤0.2; and
0.98≤m≤1.02.

18. The electronic device of claim 17 wherein said paraelectric ceramic dielectric is selected from the group consisting of Formula I wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
0<a<0.06;
0.0001<b<0.15;
0<c≤0.06;
d=0;
0≤x≤1;
0≤y≤1;
0≤u<0.8;
0≤v≤0.2; and
0.98≤m≤1.02;
Formula II wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
0<a<0.06;
0.0001<b<0.15;
c=0;
0<d<0.06;
0≤x≤1;
0≤y≤1;
0.03<u≤1;
0≤v≤0.2; and
0.98≤m≤1.02;
Formula III wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
0<a<0.06;
0.0001<b<0.15;
c=0;
0<d<0.02;
0≤x≤1;
0≤y≤1;
0≤u≤1;
0≤v≤0.2; and
0.98≤m≤1.02;
Formula IV wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Ho, Er, Tm, Yb and Lu;
0<a<0.06;
0.0001<b<0.15;
c=0;
0<d<0.06;

0≤x≤1;
0≤y≤1;
0≤u≤1;
0≤v≤0.2; and
0.98≤m≤1.02;
Formula V wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
0<a<0.06;
0.0001<b<0.15;
c=0;
0<d<0.06;
0≤x≤1;
0≤y≤1;
0.1<u<0.55;
0≤v≤0.2; and
0.98≤m≤1.02;
Formula VI wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Y, Sc, La, Ce, Pr, Nd, Sm, Eu, Gd, Tb, Dy, Ho, Er, Tm, Yb and Lu;
0<a<0.06;
0.0001<b<0.15;
c=0;
0.015<d<0.06;
0≤x≤1;
0≤y≤1;
0.1<u<0.55;
0≤v≤0.2; and
0.98≤m≤1.02; and
Formula VII wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
Z comprises at least one rare-earth element selected from the group consisting of Y, Sc, Pr, Nd, Sm, Eu, Gd, Tb, Dy, Ho, Er, Tm, Yb and Lu;
0<a<0.06;
0.0001<b<0.15;
0<c≤0.06;
0<d<0.06;
0≤x≤1;
0≤y≤1;
0.1<u<0.8;
0≤v≤0.2; and
0.98≤m≤1.02.

19. The electronic device of claim 17 wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
0<a<0.06;
0.0001<b<0.15;
0<c≤0.06;
d=0;
0≤x≤1;
0≤y≤1;
0≤u<0.8;
0≤v≤0.2; and
0.98≤m≤1.02.

20. The electronic device of claim 19 wherein U is Mn.
21. The electronic device of claim 19 wherein X is Si.
22. The electronic device of claim 19 wherein Y is W.
23. The electronic device of claim 17 wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
0<a<0.06;
0.0001<b<0.15;
c=0;
0<d<0.02;
0≤x≤1;
0≤y≤1;
0≤u≤1;
0≤v≤0.2; and
0.98≤m≤1.02.

24. The electronic device of claim 23 wherein M is Ba.
25. The electronic device of claim 23 wherein U is Mn.
26. The electronic device of claim 23 wherein X is Si.
27. The electronic device of claim 23 wherein Z is selected from the group consisting of Ce, Eu, Gd, Tb, and Dy.
28. The electronic device of claim 17 wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
0<a<0.06;
0.0001<b<0.15;

c=0;
0<d<0.02;
0≤x≤1;
0≤y≤1;
0≤u≤1;
0≤v≤0.2; and
0.98≤m≤1.02.

29. The electronic device of claim 28 wherein M is Ba.

30. The electronic device of claim 28 wherein U is Mn.

31. The electronic device of claim 28 wherein X is Si.

32. The electronic device of claim 28 wherein Z is selected from the group consisting of Pr, Eu, Gd, Tb and Dy.

33. The electronic device of claim 17 wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Ho, Er, Tm, Yb and Lu;
0<a<0.06;
0.0001<b<0.15;
c=0;
0<d<0.06;
0≤x≤1;
0≤y≤1;
0≤u≤1;
0≤v≤0.2; and
0.98≤m≤1.02.

34. The electronic device of claim 33 wherein M is Ba.

35. The electronic device of claim 33 wherein U is Mn.

36. The electronic device of claim 33 wherein X is Si.

37. The electronic device of claim 33 wherein Z is selected from the group consisting of Nd, Eu, Gd and Tb.

38. The electronic device of claim 17 wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
0<a<0.06;
0.0001<b<0.15;
c=0;
0<d<0.06;
0≤x≤1;
0≤y≤1;
0.1<u<0.55;
0≤v≤0.2; and
0.98≤m≤1.02.

39. The electronic device of claim 38 wherein M is Ba.

40. The electronic device of claim 38 wherein U is Mn.

41. The electronic device of claim 38 wherein X is Si.

42. The electronic device of claim 38 wherein Z is selected from the group consisting of Eu, Gd, Tb and Dy.

43. The electronic device of claim 17 wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Y, Sc, La, Ce, Pr, Nd, Sm, Eu, Gd, Tb, Dy, Ho, Er, Tm, Yb and Lu;
0<a<0.06;
0.0001<b<0.15;
c=0;
0.015<d<0.06;
0≤x≤1;
0≤y≤1;
0.1<u<0.55;
0≤v≤0.2; and
0.98≤m≤1.02.

44. The electronic device of claim 43 wherein M is Ba.

45. The electronic device of claim 43 wherein U is Mn.

46. The electronic device of claim 43 wherein X is Si.

47. The electronic device of claim 43 wherein Z is selected from the group consisting of Y, Eu, Gd, Tb and Dy.

48. The electronic device of claim 17 wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
Z comprises at least one rare-earth element selected from the group consisting of Y, Sc, Pr, Nd, Sm, Eu, Gd, Tb, Dy, Ho, Er, Tm, Yb and Lu;
0<a<0.06;
0.0001<b<0.15;
0<c≤0.06;
0<d<0.06;
0≤x≤1;
0≤y≤1;
0.1<u<0.8;
0≤v≤0.2; and
0.98≤m≤1.02.

49. The electronic device of claim 1 having a temperature characteristic of capacitance within ±1000 ppm/° C. over a temperature range from −55° C. to 150° C.

50. The electronic device of claim 1 wherein said paraelectric ceramic dielectric has a negative coefficient of capacitance above 25° C.

51. The electronic device of claim 1 wherein said capacitor has a first ESR measured at 50 kHz prior to exposure to a AC $V_{PP}$ above said rated DC voltage and a second ESR measured at 50 kHz after exposure to said AC $V_{PP}$ wherein said second ESR is no more than 20% higher than said first ESR.

52. The electronic device of claim 51 wherein said exposure to said AC $V_{PP}$ is at a temperature above 25° C.

53. The electronic device of claim 52 wherein said exposure to said AC $V_{PP}$ is at a temperature above 50° C.

54. The electronic device of claim 53 wherein said exposure to said AC $V_{PP}$ is at a temperature of up to 100° C.

55. The electronic device of claim 51 wherein said second ESR is no more than 10% higher than said first ESR.

56. The electronic device of claim 1 wherein said capacitor has a first ESR measured at 10 Hz to no more than 1 MHz prior to exposure to a AC $V_{PP}$ above said rated DC voltage and a second ESR measured at 10 Hz to no more than 1 MHz after exposure to said AC $V_{PP}$ wherein said second ESR is no more than 20% higher than said first ESR.

57. The electronic device of claim 56 wherein said frequency is at least 20 kHz to no more than 200 kHz.

58. The electronic device of claim 1 wherein said capacitor has a surface temperature and said surface temperature does not exceed 25° C. after exposure to a AC $V_{PP}$ above said rated DC voltage for 24 hours.

59. The electronic device of claim 58 wherein said surface temperature does not exceed 25° C. after exposure to a said AC $V_{PP}$ for at least 35,000 hours.

60. The electronic device of claim 59 wherein said surface temperature does not exceed 25° C. after exposure to a said AC $V_{PP}$ for at least 500,000 hours.

61. The electronic device of claim 60 wherein said surface temperature does not exceed 25° C. after exposure to an said AC $V_{PP}$ for at least 2,000,000 hours.

62. The electronic device of claim 1 wherein said first conductive plates are first double printed conductive plates.

63. The electronic device of claim 62 further comprising paraelectric ceramic dielectric between said first double printed conductive plates.

64. The electronic device of claim 63 wherein said first conductive plates and said second conductive plates are separated by a first distance and said first double printed conductive plates are separated by a second distance wherein said first distance is larger than said second distance.

65. The electronic device of claim 64 wherein said first distance is at least twice said second distance.

66. The electronic device of claim 1 wherein at least one of said first conductive plates or said second conductive plates comprise a base metal.

67. The electronic device of claim 66 wherein said base metal is nickel.

68. The electronic device of claim 1 wherein said DC rated voltage is 60% of a mean breakdown voltage.

69. The electronic device of claim 1 wherein at least a portion of said electronic device operates with AC current.

70. The electronic device of claim 1 wherein at least a portion of said electronic device operates with DC current.

71. The electronic device of claim 1 wherein at least a portion of said electronic device operates with AC current and at least a portion of said electronic device operates with DC current.

72. A method of forming a multilayered ceramic capacitor comprising:
forming a paraelectric dielectric ceramic comprising an oxide represented by General Formula A:

$(Ca_eSr_g)_j(Zr_kTi_p)_qO_3$      General Formula A wherein:
e=0.60 to 1.00;
g=0.00 to 0.40;
k=0.50 to 0.97;
p=0.03 to 0.50; and
j/q=0.99 to 1.01;
forming a ceramic slip comprising said dielectric ceramic;
forming a coating of said ceramic slip on a substrate;
printing a pattern of conductive ink on said coating to form a printed coating;
forming a stack comprising said printed coating and at least one ceramic precursor layer which is not printed wherein adjacent printed coatings are offset and alternated printed coatings are registration;
forming a laminate of said stack;
separating said laminate into green chips;
sintering said green chips wherein said conductive ink forms first conductive plates and second conductive plates and said ceramic slip forms a ceramic portion between said first conductive plates and said second conductive plates; and
terminating said sintered green chips.

73. The method of forming a multilayered ceramic capacitor of claim 72 wherein at least 90 mole % of said ceramic portion is said paraelectric ceramic dielectric defined by General Formula A.

74. The method of forming a multilayered ceramic capacitor of claim 72 wherein said Ca or Zr are substituted with Ba or Mg.

75. The method of forming a multilayered ceramic capacitor of claim 72 wherein said Zr or Ti are substituted with Hf.

76. The method of forming a multilayered ceramic capacitor of claim 72 wherein said paraelectric ceramic dielectric further comprise a secondary component comprising at least one element selected from the group consisting of Zn, Cu, Ni, Co, Fe, Mn, Cr, Al, Li, B, Si, W, Ta, Mo, Y, Sc, La, Ce, Pr, Nd, Sm, Eu, Gd, Tb, Dy, Ho, Er, Tm, Yb and Yu.

77. The method of forming a multilayered ceramic capacitor of claim 76 wherein said paraelectric ceramic dielectric comprises at least 0.5 mole % of said secondary component.

78. The method of forming a multilayered ceramic capacitor of claim 72 wherein said first conductive plates and said second conductive plates are separated by a first distance and said first double printed conductive plates are separated by a second distance wherein said first distance is larger than said second distance.

79. The method of forming a multilayered ceramic capacitor of claim 78 wherein said first distance is at least twice said second distance.

80. The method of forming a multilayered ceramic capacitor of claim 72 wherein at least one of said first conductive plates or said second conductive plates comprise a base metal.

81. The method of forming a multilayered ceramic capacitor of claim 80 wherein said base metal is nickel.

82. A method of forming a multilayered ceramic capacitor comprising:
forming a paraelectric ceramic dielectric defined by General Formula B:

$U_aX_bY_cZ_d((Ca_{1-x-y}Sr_xM_y)_m(Zr_{1-u-v}Ti_uHf_v)O_3)_{1-a-b-c-d}$      General Formula B wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
Z comprises at least one rare-earth element selected from the group consisting of Y, Sc, La, Ce, Pr, Nd, Sm, Eu, Gd, Tb, Dy, Ho, Er, Tm, Yb and Lu;
0<a<0.06;

$0.0001 < b < 0.15$;
$0 < c \leq 0.06$;
$0 < d < 0.06$;
$0 \leq x \leq 1$;
$0 \leq y \leq 1$;
$0 \leq u \leq 1$;
$0 \leq v \leq 0.2$; and
$0.98 \leq m \leq 1.02$;
forming a ceramic slip comprising said paraelectric ceramic dielectric;
forming a coating of said ceramic slip on a substrate;
printing a pattern of conductive ink on said coating to form a printed coating;
forming a stack comprising said printed coating and at least one ceramic precursor layer which is not printed wherein adjacent printed coatings are offset and alternated printed coatings are registration;
forming a laminate of said stack;
separating said laminate into green chips;
sintering said green chips wherein said conductive ink forms first conductive plates and second conductive plates and said ceramic slip forms a ceramic portion between said first conductive plates and said second conductive plates; and
terminating said sintered green chips.

83. The method of forming a multilayered ceramic capacitor of claim 82 wherein said paraelectric ceramic dielectric is selected from the group consisting of Formula I wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Y comprises a carbonate or oxide of at least one second transition metal selected from the group consisting of W, Ta, and Mo;
$0 < a < 0.06$;
$0.0001 < b < 0.15$;
$0 < c \leq 0.06$;
$d = 0$;
$0 \leq x \leq 1$;
$0 \leq y \leq 1$;
$0 \leq u < 0.8$;
$0 \leq v \leq 0.2$; and
$0.98 \leq m \leq 1.02$;
Formula II wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0 < a < 0.06$;
$0.0001 < b < 0.15$;
$c = 0$;
$0 < d < 0.06$;
$0 \leq x \leq 1$;
$0 \leq y \leq 1$;
$0.03 < u \leq 1$;
$0 \leq v \leq 0.2$; and
$0.98 \leq m \leq 1.02$;
Formula III wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0 < a < 0.06$;
$0.0001 < b < 0.15$;
$c = 0$;
$0 < d < 0.02$;
$0 \leq x \leq 1$;
$0 \leq y \leq 1$;
$0 \leq u \leq 1$;
$0 \leq v \leq 0.2$; and
$0.98 \leq m \leq 1.02$;
Formula IV wherein:
M is Ba;
U comprising a carbonate or oxide of at least one first transition metal selected from the group consisting of Zn, Cu, Ni, Co, Fe, Mn, and Cr;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Ho, Er, Tm, Yb and Lu;
$0 < a < 0.06$;
$0.0001 < b < 0.15$;
$c = 0$;
$0 < d < 0.06$;
$0 \leq x \leq 1$;
$0 \leq y \leq 1$;
$0 \leq u \leq 1$;
$0 \leq v \leq 0.2$; and
$0.98 \leq m \leq 1.02$;
Formula V wherein:
M is at least one alkaline earth selected from the group consisting of Ba and Mg;
U comprising a carbonate or oxide of at least one first transition metal selected from the group consisting of Zn, Cu, Ni, Co, Fe, Mn, Cr, and Al;
X comprises at least one sintering aid comprising a compound comprising at least one element selected from the group consisting of Li, B, and Si;
Z comprises at least one rare-earth element selected from the group consisting of Sc, La, Ce, Pr, Nd, Sm, Eu, Gd, Tb, Dy, Ho, Er, Tm, Yb and Lu;
$0 < a < 0.06$;
$0.0001 < b < 0.15$;
$c = 0$;
$0 < d < 0.06$;
$0 \leq x \leq 1$;
$0 \leq y \leq 1$;
$0.1 < u < 0.55$;
$0 \leq v \leq 0.2$; and
$0.98 \leq m \leq 1.02$;
Formula VI wherein:
M is at least one alkaline earth selected from the group consisting of Ba and Mg;

U comprising a carbonate or oxide of at least one first transition metal selected from the group consisting of Zn, Cu, Ni, Co, Fe, Mn, Cr, and Al;

X comprises at least one sintering aid comprising a compound comprising at least one element selected from the group consisting of Li, B, and Si;

Z comprises at least one rare-earth element selected from the group consisting of Y, Sc, La, Ce, Pr, Nd, Sm, Eu, Gd, Tb, Dy, Ho, Er, Tm, Yb and Lu;

$0 < a < 0.06$;
$0.0001 < b < 0.15$;
$c = 0$;
$0.015 < d < 0.06$;
$0 \leq x \leq 1$;
$0 \leq y \leq 1$;
$0.1 < u < 0.55$;
$0 \leq v \leq 0.2$; and
$0.98 \leq m \leq 1.02$; and Formula VII wherein:

M is at least one alkaline earth selected from the group consisting of Ba and Mg;

U comprising a carbonate or oxide of at least one first transition metal selected from the group consisting of Zn, Cu, Ni, Co, Fe, Mn, Cr, and Al;

X comprises at least one sintering aid comprising a compound comprising at least one element selected from the group consisting of Li, B, and Si;

Y comprises a carbonate or oxide of at least one second transition metal selected from the group consisting of W, Ta, and Mo;

Z comprises at least one rare-earth element selected from the group consisting of Y, Sc, Pr, Nd, Sm, Eu, Gd, Tb, Dy, Ho, Er, Tm, Yb and Lu;

$0 < a < 0.06$;
$0.0001 < b < 0.15$;
$0 < c \leq 0.06$;
$0 < d < 0.06$;
$0 \leq x \leq 1$;
$0 \leq y \leq 1$;
$0.1 < u < 0.8$;
$0 \leq v \leq 0.2$; and
$0.98 \leq m \leq 1.027$.

84. The method of forming a multilayered ceramic capacitor of claim 82 wherein said first conductive plates and said second conductive plates are separated by a first distance and first double printed conductive plates are separated by a second distance wherein said first distance is larger than said second distance.

85. The method of forming a multilayered ceramic capacitor of claim 84 wherein said first distance is at least twice said second distance.

86. The method of forming a multilayered ceramic capacitor of claim 82 wherein at least one of said first conductive plates or said second conductive plates comprise a base metal.

87. The method of forming a multilayered ceramic capacitor of claim 86 wherein said base metal is nickel.

* * * * *